United States Patent
Browning et al.

(10) Patent No.: US 12,457,302 B2
(45) Date of Patent: Oct. 28, 2025

(54) APPARATUS, SYSTEMS, AND METHODS FOR AUDIO AND VIDEO FILTERING FOR ELECTRONIC USER DEVICES

(71) Applicant: Intel Corporation, Santa Clara, CA (US)

(72) Inventors: David Browning, Portland, OR (US); Michael Rosenzweig, San Ramon, CA (US)

(73) Assignee: Intel Corporation, Santa Clara, CA (US)

(*) Notice: Subject to any disclaimer, the term of this patent is extended or adjusted under 35 U.S.C. 154(b) by 714 days.

(21) Appl. No.: 17/483,552

(22) Filed: Sep. 23, 2021

(65) Prior Publication Data

US 2022/0014815 A1 Jan. 13, 2022

(51) Int. Cl.
- *H04N 7/15* (2006.01)
- *H04N 21/431* (2011.01)
- *H04N 21/439* (2011.01)
- *H04N 21/4545* (2011.01)

(52) U.S. Cl.
CPC ........... *H04N 7/15* (2013.01); *H04N 21/4318* (2013.01); *H04N 21/4394* (2013.01); *H04N 21/4396* (2013.01); *H04N 21/45457* (2013.01)

(58) Field of Classification Search
CPC .......... H04N 21/4396; H04N 21/4394; H04N 21/45457; H04N 7/15; H04N 21/4318
See application file for complete search history.

(56) References Cited

U.S. PATENT DOCUMENTS

| 4,811,404 | A | 3/1989 | Vilmur |
| 5,978,080 | A | 11/1999 | Michael et al. |
| 6,363,344 | B1 | 3/2002 | Higuchi |
| 6,593,956 | B1 | 7/2003 | Potts et al. |
| 8,681,203 | B1 * | 3/2014 | Yin .................. H04N 7/15 348/14.09 |
| 9,197,974 | B1 | 11/2015 | Clark |
| 9,298,974 | B1 | 3/2016 | Kuo et al. |

(Continued)

FOREIGN PATENT DOCUMENTS

| CN | 111754990 A | * | 10/2020 | ............. G06V 40/10 |
| WO | WO-2011123757 A1 | * | 10/2011 | ......... G06F 19/3493 |
| WO | WO-2022067293 A1 | * | 3/2022 | ............... H04N 7/15 |

OTHER PUBLICATIONS

European Patent Office, "Extended European Search Report," issued in connection with European Patent Application No. 22191774.3, dated Feb. 20, 2023, 9 pages.

(Continued)

*Primary Examiner* — John R Schnurr
(74) *Attorney, Agent, or Firm* — Hanley, Flight & Zimmerman, LLC

(57) ABSTRACT

Apparatus, systems, and methods for audio and video filtering for electronic user devices are disclosed. An example apparatus includes at least one memory, instructions in the apparatus, and processor circuitry to execute instructions to detect a visual event based on image data, the visual event representative of an activity associated with a likelihood of noise, the image data associated with a video stream output by a camera associated with a user device, and in response to the detection of the visual event, apply an audio filter to a portion of an audio stream corresponding to the image data in the video stream.

24 Claims, 13 Drawing Sheets

(56) References Cited

U.S. PATENT DOCUMENTS

| | | |
|---|---|---|
| 10,027,883 B1 | 7/2018 | Kuo |
| 10,027,888 B1 | 7/2018 | Mackraz |
| 10,440,324 B1* | 10/2019 | Lichtenberg .......... G10L 19/018 |
| 10,819,950 B1 | 10/2020 | Lichtenberg et al. |
| 10,820,795 B1 | 11/2020 | Weise |
| 11,252,374 B1 | 2/2022 | Lichtenberg et al. |
| 2003/0035001 A1 | 2/2003 | Van Geest et al. |
| 2008/0002948 A1 | 1/2008 | Murata et al. |
| 2008/0136895 A1 | 6/2008 | Mareachen |
| 2008/0260131 A1 | 10/2008 | Akesson |
| 2008/0279425 A1 | 11/2008 | Tang |
| 2009/0015658 A1 | 1/2009 | Enstad et al. |
| 2009/0189783 A1 | 7/2009 | Koitabashi |
| 2010/0123785 A1 | 5/2010 | Chen et al. |
| 2011/0161074 A1* | 6/2011 | Pance ....................... H04N 7/15 704/231 |
| 2011/0304693 A1 | 12/2011 | Border et al. |
| 2011/0316996 A1 | 12/2011 | Abe et al. |
| 2012/0150333 A1 | 6/2012 | De Luca et al. |
| 2012/0183161 A1 | 7/2012 | Agevik et al. |
| 2013/0156209 A1 | 6/2013 | Visser et al. |
| 2013/0202130 A1 | 8/2013 | Zurek |
| 2014/0085446 A1 | 3/2014 | Hicks |
| 2014/0169627 A1 | 6/2014 | Gupta |
| 2014/0337016 A1 | 11/2014 | Herbig et al. |
| 2014/0341547 A1 | 11/2014 | Shenoy et al. |
| 2015/0131803 A1* | 5/2015 | Weksler ................... H04R 3/00 381/56 |
| 2015/0264299 A1 | 9/2015 | Leech |
| 2015/0296319 A1 | 10/2015 | Shenoy et al. |
| 2016/0073054 A1* | 3/2016 | Balasaygun ........ H04L 12/1822 348/14.08 |
| 2016/0195856 A1 | 7/2016 | Spero |
| 2017/0127035 A1 | 5/2017 | Kon et al. |
| 2017/0186441 A1 | 6/2017 | Wenus et al. |
| 2017/0201825 A1 | 7/2017 | Whyte et al. |
| 2018/0084365 A1 | 3/2018 | Ugur et al. |
| 2018/0144746 A1 | 5/2018 | Mishra et al. |
| 2018/0310114 A1 | 10/2018 | Eronen et al. |
| 2019/0172462 A1 | 6/2019 | Mishra et al. |
| 2019/0313014 A1 | 10/2019 | Welbourne |
| 2019/0317594 A1 | 10/2019 | Stent |
| 2019/0394606 A1 | 12/2019 | Tammi et al. |
| 2020/0028884 A1* | 1/2020 | Childers ............. G10L 21/0208 |
| 2020/0110572 A1* | 4/2020 | Lenke ...................... G06F 3/167 |
| 2020/0137489 A1 | 4/2020 | Sheaffer et al. |
| 2020/0145617 A1* | 5/2020 | Zavesky .............. G06T 19/006 |
| 2020/0184987 A1 | 6/2020 | Kupryjanow et al. |
| 2020/0314483 A1* | 10/2020 | Rakshit .............. H04N 21/4318 |
| 2020/0393159 A1* | 12/2020 | Takayanagi .......... G06V 40/168 |
| 2021/0092517 A1 | 3/2021 | Kulkarni et al. |
| 2021/0116983 A1 | 4/2021 | Hallberg et al. |
| 2021/0318850 A1 | 10/2021 | Thomas |
| 2021/0321212 A1 | 10/2021 | Li et al. |
| 2022/0059071 A1* | 2/2022 | Pearce ............... H04N 21/4788 |
| 2022/0060525 A1* | 2/2022 | Chavez .................. G06V 40/18 |
| 2022/0159403 A1 | 5/2022 | Sporer et al. |
| 2022/0239848 A1* | 7/2022 | Swierk ................... H04N 7/147 |
| 2022/0295012 A1* | 9/2022 | Swierk ................... G06N 3/045 |
| 2022/0319063 A1* | 10/2022 | Mizobuchi ............. G06V 40/20 |
| 2023/0103060 A1 | 3/2023 | Chaudhuri et al. |

OTHER PUBLICATIONS

"A Method and Apparatus for Smart Auto-Mute of Conference Participants," IP.com Prior Art Database Technical Disclosure, May 1, 2014, 12 pages.

United States Patent and Trademark Office, "Notice of Allowance and Fee(s) Due," issued in connection with U.S. Appl. No. 17/358,894, dated May 13, 2025, 14 pages.

Feng et al., "Face Detection, Bounding Box Aggregation and Pose Estimation for Robust Facial Landmark Localisation in the Wild," 2017 IEEE Conference on Computer Vision and Pattern Recognition Workshops (CVPRW), 2017, pp. 160-169, 10 pages.

United States Patent and Trademark Office, "Non-Final Office Action," issued in connection with U.S. Appl. No. 17/358,894, dated Jul. 19, 2024, 21 pages.

United States Patent and Trademark Office, "Final Office Action," issued in connection with U.S. Appl. No. 17/358,894, dated Nov. 14, 2024, 27 pages.

Warusfel, "Listen HRTF Database," dated Sep. 6, 2002, updated May 25, 2003, retrieved from http://recherche.ircam.fr/equipes/salles/listen/, 1 page.

United States Patent and Trademark Office, "Non-Final Office Action," issued in connection with U.S. Appl. No. 17/475,235, dated Oct. 30, 2024, 15 pages.

United States Patent and Trademark Office, "Final Office Action," issued in connection with U.S. Appl. No. 17/475,235, dated Feb. 11, 2025, 19 pages.

European Patent Office, "Communication pursuant to Article 94(3) EPC," issued in connection with European Patent Application No. 22191774.3, Mar. 10, 2025, 7 pages.

United States Patent and Trademark Office, "Notice of Allowance and Fee(s) Due," issued in connection with U.S. Appl. No. 17/358,894, dated Apr. 7, 2025, 14 pages.

United States Patent and Trademark Office, "Notice of Allowance and Fee(s) Due," issued in connection with U.S. Appl. No. 17/475,235, dated Sep. 15, 2025, 8 pages.

* cited by examiner

APPARATUS, SYSTEMS, AND METHODS FOR AUDIO AND VIDEO FILTERING FOR ELECTRONIC USER DEVICES

FIELD OF THE DISCLOSURE

This disclosure relates generally to electronic user devices and, more particularly, apparatus, systems, and related method for audio and video filtering for electronic user devices.

BACKGROUND

An electronic user device such as a laptop includes one or more microphones to capture audio such as a voice of a user of the device. The microphone(s) can be used during a video call in which an image of the user is captured via camera(s) of the electronic device in addition to the audio captured by the microphone(s).

BRIEF DESCRIPTION OF THE DRAWINGS

The figures are not to scale. In general, the same reference numbers will be used throughout the drawing(s) and accompanying written description to refer to the same or like parts.

Figure 1:
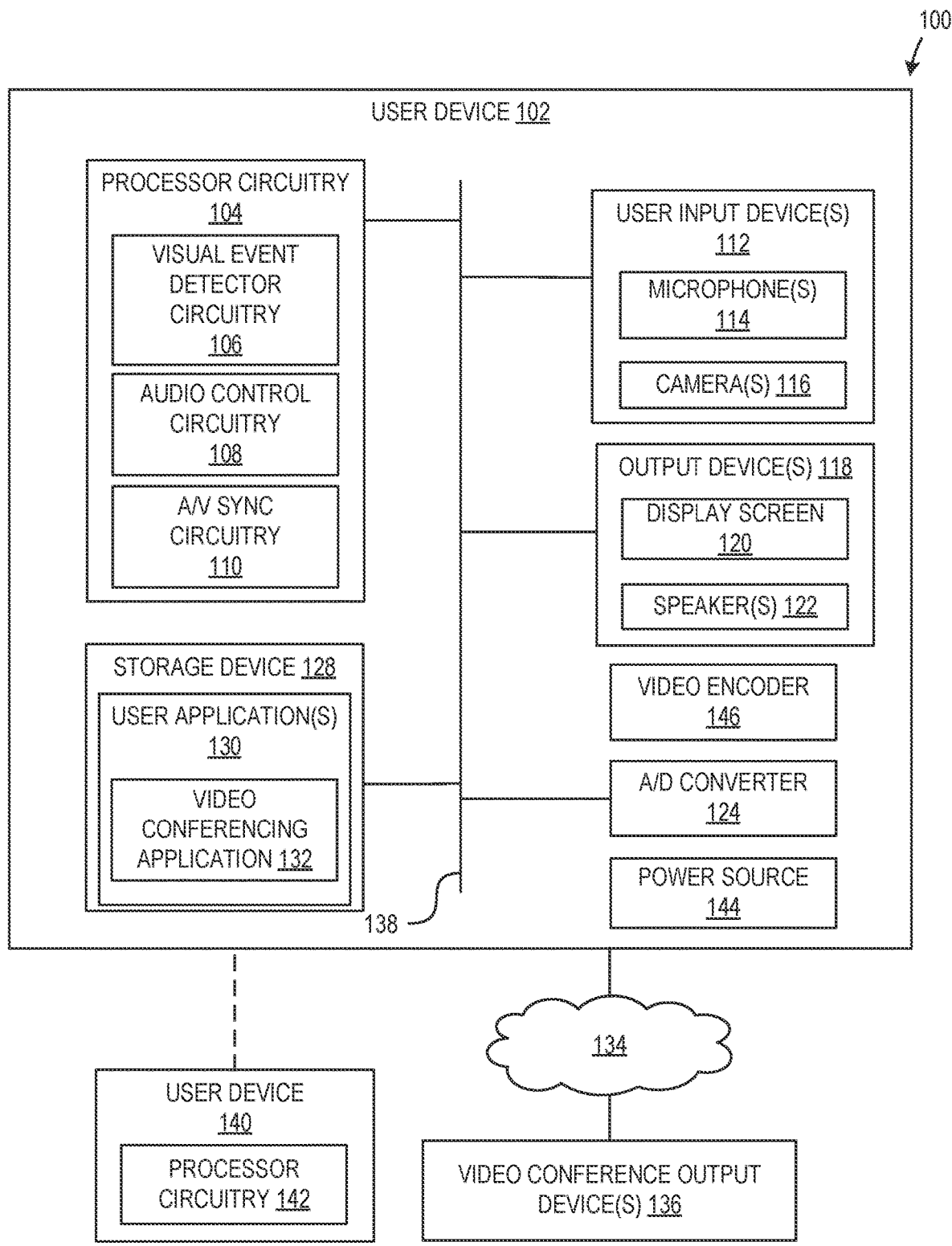
FIG. 1 illustrates an example system constructed in accordance with teachings of this disclosure and including a user device, visual event detector circuitry for detecting a visual event representative of an activity indicative of a likelihood of spurious noise in a video stream, and audio control circuitry for filtering audio in response to the detection of the visual event in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device such as a laptop, tablet, or smartphone includes one or more microphones (e.g., a built-in microphone array) to capture sound such as speech by a user of the device and/or sounds in an environment in which the device is located. The microphones convert the sound into electrical signal(s) for processing by processor circuitry of the user device. The user device may include user applications such as a video conferencing application installed thereon. During a video conference, the one or more microphones of the device capture sounds generated by the user and/or by subjects (e.g., animals, objects) in the environment in which the device is located while one or more cameras of the electronic user device capture image(s) (e.g., video) of the user of the device and/or the environment in which the device is located.

In some instances, the user may generate an audio event other than speech that is captured by the microphone(s) of the device during a video conference. For instance, the user may sneeze, cough, or yawn. In some examples, a dog or other animal in the environment that the device is located may generate noise such as barking, which can be captured by the microphone(s). In other examples, an object in the environment in which the device is located, such as a box or a book, may fall from a shelf during the video conference and the resulting noise is captured by the microphone(s). Noise associated with such activities or events can be disruptive to the video conference and unwanted by the user and/or by the other participants of the conference. Because of the suddenness of an event such as a sneeze, the user may not be able to manually mute the audio of the device before sneezing.

Some known devices provide for noise reduction by masking constant or substantially constant background noise. However, noise associated with activities such as sneezing, coughing, animal barking, etc. can occur randomly, may be brief, and/or may occur without warning and, thus, are difficult to detect for audio filtering purposes. In some known examples, an audio filter may be applied some time after detection of the audio event. However, as a result of such latency, at least some of the noise associated with the activity (e.g., a user activity such as sneezing, an event such as a dog barking) may be captured in the audio stream output to the participants of the video conference. Also, in some examples, introduction of latencies in filtering the noise can cause the audio stream to be offset from the video stream such that user movements are misaligned with the audio output.

Disclosed herein are example systems, apparatus, and methods that provide for dynamic filtering of audio event(s) from an audio stream and/or visual event(s) from a video stream based on detection of visual event(s) or cue(s) indicative of the occurrence or likely occurrence of an audio event associated with spurious noise. As used herein, the term "spurious noise" refers to noise that is, for example, one or more of random, unpredictable, sudden, unintended, unexpected, asynchronous, and/or extraneous to speech by the user(s) during a video conference. Spurious noise can include noise generated by the user(s) other than speech, such as noise from coughing, sneezing, eating, etc. Spurious noise can include noise generated by other subject(s) in the environment in which the user is located, such as a dog barking, a cat scratching a chair leg, or a box falling from a shelf In examples disclosed herein, image data is generated by a camera associated with a user device during, for instance, a video conference. Also, during the video conference, audio data from the user and/or the environment is captured via microphone(s) associated with the device (e.g., a built-in microphone array). Examples disclosed herein include visual event detector circuitry to detect visual cues, events, and/or triggers in image data (e.g., video frames) of the user and/or other subjects (e.g., animals, objects in the room) that indicate that an audio event associated with spurious noise is likely to occur. As disclosed herein, the spurious noise can include, for instance, a sneeze, a cough, a yawn, a noise made by an animal, etc. Some examples disclosed herein execute neural network models to identify visual events associated with activities or events such as yawning, sneezing, etc. in the image data. For instance, the visual event detector circuitry can identify movement(s) and/or facial expression(s) by the user indicating that the user is likely to perform or is performing an activity such as yawning (e.g., as represented by the user raising his or her hand to his or her mouth).

In examples disclosed herein, the visual event(s) indicative of a likelihood of spurious noise serve as a trigger to filter the corresponding audio stream. Examples disclosed herein include audio control circuitry to apply an audio filter, an audio mute, an audio mask, or otherwise remove the audio event associated with the spurious noise from being output during the video conference or reduce a volume at which the noise is output. Some examples disclosed herein additionally provide for filtering of the video stream in response the detection of the visual event(s). For instance, examples disclosed here can apply a filter to the video frame(s) to blur or conceal (e.g., black out) at least a portion the video frame(s) associated with the visual event(s) to, for instance, minimize distractions to other participants of the video conference.

Examples disclosed herein automatically resume output of the audio without noise reduction (e.g., unmute, stop the application of the filter, etc.) based on analysis of the video frame(s) and the visual event(s). For instance, the visual event detector circuitry analyzes subsequently generated image data to detect that the user has lowered his or her hand away from his or her face after a sneeze. Similarly, in examples in which the video frame is filtered, examples disclosed herein automatically remove the filter to resume output of the video without filter effects upon a determination that the event associated with the spurious noise has ended. Thus, examples disclosed herein provide for efficient filtering or mitigation of spurious noise from video conferences using video data generated during the video conference without involving user interaction. Further, examples disclosed herein detect or predict the likely occurrence of spurious noise events and, thus, reduce or substantially eliminate latency in responding to the audio events.

FIG. 1 illustrates an example system 100 constructed in accordance with teachings of this disclosure for filtering an audio stream and/or video stream in response to detection visual events representative of an activity or event that can introduce spurious noise. The example system 100 of FIG. 1 includes a user device 102. The user device 102 can be a personal computing device such as a laptop, a desktop computer, an electronic tablet, a smartphone, etc.

The example user device 102 includes one or more microphones 114. The microphone(s) 114 provide means for detecting sounds in the environment in which the user device 102 is located. In some examples, the user device 102 includes two or more microphones defining a microphone array. The microphone(s) 114 can be carried by the user device 102 on, for example, one or more sides of a lid of the device 102. In other examples, the microphone(s) 114 are an accessory removably coupled to one or portions of the user device 102. The example user device 102 includes an analog-to-digital (A/D) converter 124 to convert analog signals from the microphone(s) 114 to digital signal(s).

The example user device 102 includes a display screen 120 to present graphical content to a user of the user device 102. In some examples, the display screen 120 is a touch screen that enables a user to interact with data presented on the display screen 120 by touching the display screen 120 with a stylus and/or one or more fingers or a hand of the user. Additionally or alternatively, the user can interact with data presented on the display screen 120 via user input device(s) 112 such as the microphone(s) 114, a keyboard, a mouse, touch pad, etc. The example user device 102 includes one or more output device(s) 118 such as speaker(s) 122 to provide audible outputs to the user of the user device 102.

The example user device 102 of FIG. 1 includes one or more camera(s) 116. The camera(s) 116 provide means for generating image data including the user and/or an environment in which the user device 102 is located. The camera(s) 116 can include a user-facing camera such that when the user faces the display screen 120, the user is within a field of view of the camera(s) 116. The camera(s) 116 of the user device 102 can include a video camera. The camera(s) 116 can be integrated with (e.g., built-into) a housing of the user device 102. In other examples, the camera(s) 116 are removably coupled to one or portions of the user device 102. For example, a camera 116 (e.g., a webcam) can be coupled to the user device 102 (e.g., to a lid of a laptop, to a monitor of a desktop). The example user device 102 of FIG. 1 includes a video encoder 146 to process image data output by the camera(s) 116.

The example user device 102 of FIG. 1 includes processor circuitry 104. The processor circuitry 104 of the example user device 102 is a semiconductor-based hardware logic device. The hardware processor circuitry 104 may implement a central processing unit (CPU) of the user device 102, may include any number of cores, and may be implemented, for example, by a processing commercially available from Intel® Corporation. The processor circuitry 104 executes machine readable instructions (e.g., software) including, for example, user application(s) 130 such as a video conferencing application 132 installed on the user device 102. The user application(s) 130 are stored in one or more storage devices 128 such as non-volatile memory (e.g., flash memory). The example user device 102 of FIG. 1 includes a power source 144 such as a battery and/or transformer and AC/DC converter to provide power to the processor circuitry 104 and/or other components of the user device 102 communicatively coupled via a bus 138.

In the example of FIG. 1, the microphone(s) 114 can be used to output audio signal(s) in response to sound (e.g., speech) captured from the user and/or other subject(s) in the environment (where subject(s) can include user(s) (i.e., human being(s), animal(s), material object(s), etc.). Also, the camera(s) 116 of the user device 102 can generate image data including at least a portion of one or more users of the user device, such as a face of a user, and/or the environment in which the user(s) are located. In some examples, the microphone(s) 114 and the camera(s) 116 are used by the video conferencing application 132 such that sound and image data associated with the user and/or the user's environment are captured by the microphone(s) 114 and the camera(s) 116, respectively, and processed by the user device 102 for transmission to user device(s) associated with other participant(s) of the teleconference.

In the example of FIG. 1, image data generated by the camera(s) 116 of the user device 102 (e.g., during use of the video conferencing application 132) and processed by the video encoder 146 is passed to visual event detector circuitry 106 to identify visual events or cues representative of activity that is indicative of the occurrence or likely occurrence of an audio event associated with spurious noise. The example visual event detector circuitry 106 analyzes the image data to detect the subject(s) (e.g., the user(s)) captured in the image data using a neural network trained with, for instance, subject detection models. The image data including is analyzed by the example visual event detector circuitry 106 to identify, for instance, a user or other subject performing action(s) indicative of the occurrence or likely occurrence of an audio event associated with spurious noise (e.g., pre-motion associated with a sneeze or a cough, such as raising a hand to a mount). In response to the detection of a visual event indicative of an activity or event associated with spurious noise, the example visual event detector circuitry 106 determines a stage of the activity or event (e.g., a starting stage, an active stage, an ending stage, etc.). For example, based on the neural network analysis, the visual event detector circuitry 106 can identify first image data including one or more video frames of a user raising his or her hand to his or her face as indicative of a starting phase or preceding stage of an activity such as a sneeze. The visual event detector circuitry 106 can identify second image data (e.g., subsequent video frame(s)) of the user with his or her hand over his or her nose captured after the first image data as indicative of an active phase of the sneeze. The visual event detector circuitry 106 can identify third image data of the user with his or her hand positioned away from his or her face as indicative of an ending phase of the sneeze, where the third image data (e.g., video frame(s)) is captured after the first image data and the second image data. In some examples disclosed herein, the stages of the detected activity in the image data (e.g., a sequence of video frames) are used to control application of an audio filter to the audio stream and/or a video filter to a video stream.

In some examples, the visual event detector circuitry 106 filters or masks the video stream in response to the detection of visual event(s) in the image data associated with spurious audio event(s) to prevent image(s) of the subject(s) performing the activity from being output to the other participants in the video conference. For example, the visual event detector circuitry 106 can cause or generate instructions to cause a portion of the video stream including the image data that includes the visual event(s) to blurred. In some examples, the visual event detector circuitry 106 applies or causes the video filter to be applied for a predefined time period (e.g., based on reference data indicating the average duration of a sneeze or yawn). In other examples, the visual event detector circuitry 106 applies or causes the video filter to be applied based on the stage of the activity represented by the visual event(s). For example, the visual event detector circuitry 106 blur or black out the video frames or portion(s) of the video frames that include visual event(s) in which the activity is in the starting and/or active stage(s). In such instances, the visual event detector circuitry 106 stops applying the filter when the visual event detector circuitry 106 determines that the activity is in the ending stage (i.e., based on the analysis of the image data).

In the example of FIG. 1, visual event detector circuitry 106 is implemented by executable instructions executed on the processor circuitry 104 of the user device 102. However, in other examples, visual event detector circuitry 106 is implemented by processor circuitry 142 of another user device 140 (e.g., a smartphone, an edge device, a wearable device, etc.) in communication with the user device 102 (e.g., via wired or wireless communication protocols), and/or by a cloud-based device 134 (e.g., one or more server(s), processor(s), and/or virtual machine(s)). In other examples, the visual event detector circuitry 106 is implemented by dedicated circuitry located on the user device 102 and/or the user device 140. These components may be implemented in software, hardware, or in any combination of two or more of software, firmware, and/or hardware.

In the example of FIG. 1, the identification of the visual event(s) indicative of the occurrence or likely occurrence of spurious noise and the activity or event stage determined by the visual event detector circuitry 106 is passed to audio control circuitry 108. In the example of FIG. 1, the audio control circuitry 108 applies a filter or a mask to the audio stream, mutes the audio stream, causes a volume of the audio stream to be reduced, or otherwise removes or mitigates the spurious noise audio event(s) from the audio stream, in response to detection of the visual event(s) indicative of the occurrence or likely occurrence of spurious noise. In some examples, the audio control circuitry 108 causes the audio stream to be muted. In other examples, the audio control circuitry 108 causes a volume of the audio stream or a portion of the audio stream to be reduced. In other examples, the audio control circuitry 108 applies a low pass filter to filter components of the audio signal associated with the user's voice to remove or dampen the audio signal associated with the spurious noise audio event(s). In other examples, the audio control circuitry 108 can apply a mask to the audio stream.

In some examples, the audio control circuitry 108 applies the audio filter for a predefined time period (e.g., based on reference data indicating the average duration of a sneeze or yawn, based predefined or learned durations associated with a particular user, etc.). In other examples, the audio control circuitry 108 applies the audio filter based on the stage of the activity represented by the visual event(s). For example, the audio control circuitry 108 can apply the audio filter based on instructions from the visual event detector circuitry 106 that the activity is in the starting and/or active stages. The audio control circuitry 108 can remove the filter (e.g., unmute the audio stream, stop filtering the audio stream) based on instructions from the visual event detector circuitry 106 that the activity is in the ending stage.

In the example of FIG. 1, the audio control circuitry 108 is implemented by executable instructions executed on the processor circuitry 104 of the user device 102. However, in other examples, audio control circuitry 108 is implemented by the processor circuitry 142 of the other user device 140 and/or by the cloud-based device(s) 134 (e.g., one or more server(s), processor(s), and/or virtual machine(s)). In other examples, the visual event detector circuitry 106 is implemented by dedicated circuitry located on the user device 102 and/or the user device 140. These components may be implemented in software, hardware, or in any combination of two or more of software, firmware, and/or hardware.

In the example of FIG. 1, audio/video (A/V) sync circuitry 110 performs time synchronization of the filtered audio stream and the (e.g., filtered) video stream. The A/V sync circuitry 110 outputs data including synchronized video data and audio data for transmission to video conference output device(s) 136 (e.g., laptops, smartphones, etc. associated with other participants of the video conference). The audio and/or video data may be transmitted to the video conferencing output device(s) based on communication protocols associated with, for instance, the video conferencing application 132 (e.g., voice-over-internet protocol(s)). As a result of the audio filter provided by the audio control circuitry 108, spurious or asynchronous audio events in the audio stream output at the video conferencing output device(s) 136 (e.g., by speaker(s) of the video conferencing output device(s) 136) are reduced or substantially eliminated.

Although in the example of FIG. 1, the visual event detector circuitry 106 and the audio control circuitry 108 are discussed in connection with the user device 102 that generates the video stream and the audio stream and transmits the audio and video stream(s), in other examples, the visual event detector circuitry 106 and/or the audio control circuitry 108 are implemented by a video conference output device that receives the video and audio streams. In such examples, the receiving device performs the analysis of the image data to detect visual event(s) associated with spurious audio event(s) and to filter the video and/or audio data as disclosed herein.

Figure 2:
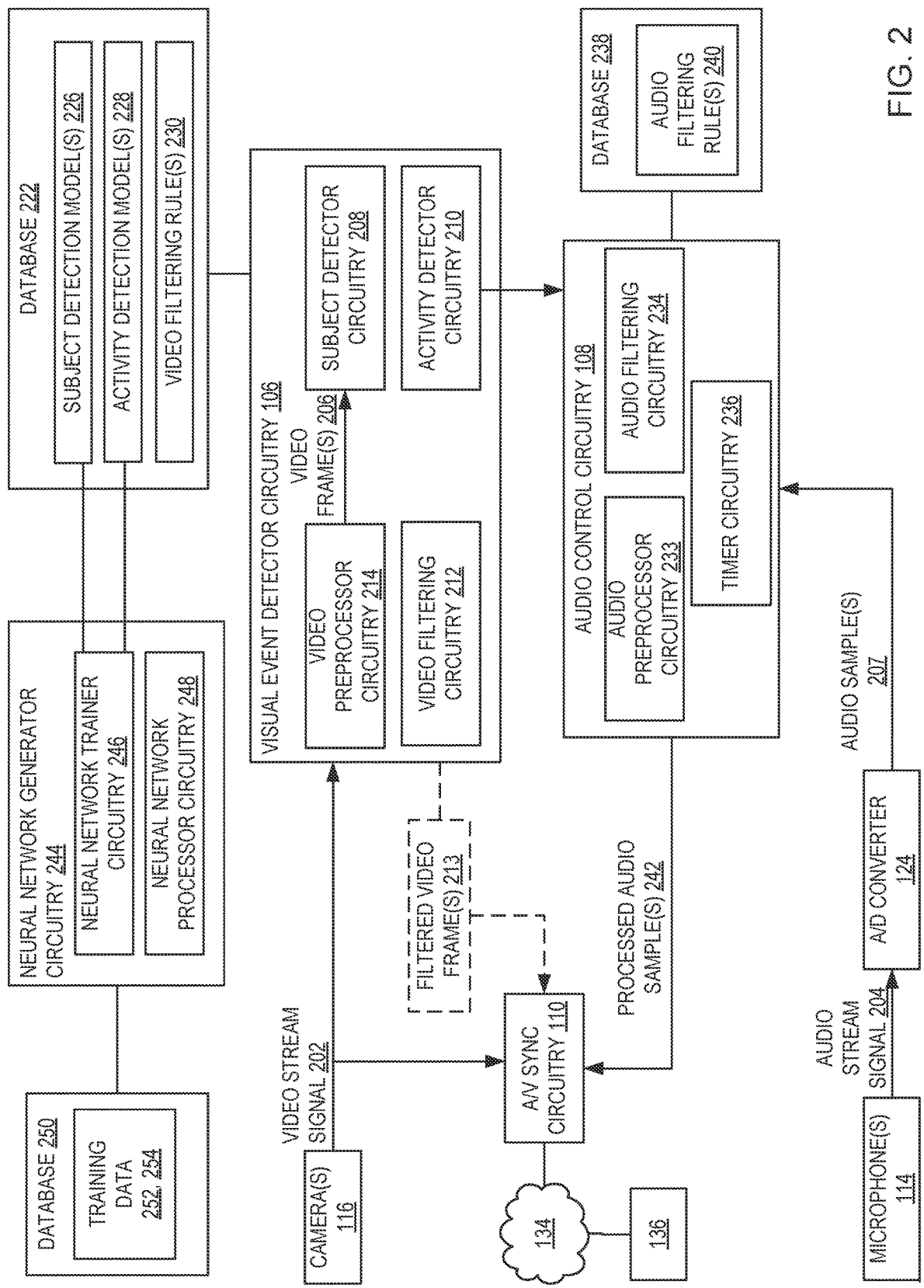
FIG. 2 is a block diagram of an example implementation of the visual event detector circuitry of FIG. 1 and an example implementation of the audio control circuitry of FIG. 1.

FIG. 2 is a block diagram of an example implementation of the visual event detector circuitry 106 and the audio control circuitry 108 of FIG. 1. As mentioned above, the visual event detector circuitry 106 is structured to identify (e.g., predict, detect, recognize) visual event(s) indicative of activit(ies) or event(s) performed by or associated with a user of the user device 102 of FIG. 1 or subject(s) in the environment in which the user device 102 is located that are associated with or likely to be associated with spurious noise (e.g., a sneeze, a dog barking, etc.). In the example of FIG. 2, the visual event detector circuitry 106 is implemented by one or more of the processor circuitry 104 of the user device 102, the processor circuitry 142 of the second user device 140, cloud-based device(s) 134 (e.g., server(s), processors(s), and/or virtual machine(s) in the cloud 134 of FIG. 1 executing instructions), and/or processor circuitry of another device such as a video conference output device 136 (e.g., a user device of another participant in a video conference). In some examples, some of the visual event analysis is implemented by the visual event detector circuitry 106 via a cloud-computing environment and one or more other parts of the analysis is implemented by the processor circuitry 104 of the user device 102 and/or the processor circuitry 142 of the user device 140 such as a wearable device. In some examples, the visual event detection circuitry 106 is implemented by special purpose circuitry.

As also mentioned above, the audio control circuitry 108 is structured to filter, mute, mask, dampen, or otherwise remove spurious audio events from audio signal(s) including spurious noise generated by the subject(s) (e.g., noise associated with sneezing, yawning, throat clearing, coughing, etc.) and output by the user device 102. In the example of FIG. 2, the audio control circuitry 108 is implemented by one or more of the processor circuitry 104 of the user device 102, the processor circuitry 142 of the second user device 140, cloud-based device(s) 134 (e.g., server(s), processors(s), and/or virtual machine(s) in the cloud 134 of FIG. 1 executing instructions), and/or processor circuitry of another device such as a video conference output device 136 (e.g., a user device of another participant in a video conference). In some examples, some of the audio analysis is implemented by the audio control circuitry 108 via a cloud-computing environment and one or more other parts of the analysis is implemented by the processor circuitry 104 of the user device 102 and/or the processor circuitry 142 of the user device 140 such as a wearable device. In some examples, the audio control circuitry 108 is implemented by special purpose circuitry.

During a video conference using the user device 102 (e.g., during operation of the video conferencing application 132), the camera(s) 116 (e.g., video camera(s)) of the user device 102 of FIG. 1 generate image data in the form of a video stream or feed signal 202 (e.g., output by the video encoder 146 of FIG. 1). In the example of FIG. 2, the video stream signal 202 is provided to the visual event detector circuitry 106 for analysis with respect to visual event(s) indicative of activit(ies) or event(s) by the user (e.g., the speaker) or other subject(s) in the environment associated with or likely to be associated with spurious noise. Also, during a video conference, the microphone(s) 114 of the user device 102 generate an audio stream signal 204 based on sound captured from the user of the user device 102 and/or the environment in which the user device 102 is located. As disclosed herein, the audio stream signal 204 is sampled and the samples are provided to the audio control circuitry 108 for filtering with respect to spurious noise.

The example visual event detector circuitry 106 of FIG. 2 includes video preprocessor circuitry 214, subject detector circuitry 208, activity detector circuitry 210, and video filtering circuitry 212

In the example of FIG. 2, the video preprocessor circuitry 214 samples the video stream signal 202 output by the camera(s) 116. In some examples, the video preprocessor circuitry 214 down samples and/or reduces a frame rate of the video steam signal 202. The video preprocessor circuitry 214 generates processed video frame(s) 206 as a result of the sampling. The video frame(s) 206 can be stored in the database 222. In some examples, the visual event detector circuitry 106 includes the database 222. In other examples, the database 222 is located external to the visual event detector circuitry 106 in a location accessible to the visual event detector circuitry 106 as shown in FIG. 2.

The example subject detector circuitry 208 detects subject(s) (e.g., human user(s), animal(s), other object(s) in the environment, etc.) in the video frames 206. In the example of FIG. 2, the subject detector circuitry 208 executes one or more neural network model(s) to detect the subject(s) in the respective video frame(s) 206. For example, the example subject detector circuitry 208 of FIG. 4 executes one or more subject detection model(s) 226 to identify face(s) in the video frame(s) 206 and, thus, recognize user(s). As another example, the subject detector circuitry 208 executes the subject detection model(s) to identify animals such as a dog in the video frame(s) 206. As disclosed herein, the subject detection model(s) 226 are generated as a result of neural network training. In the example of FIG. 2, the subject detection model(s) 226 are stored in a database 222.

The example activity detector circuitry 210 of FIG. 2 analyzes the video frame(s) 207 identified by the subject detector circuitry 208 as including subject(s) (e.g., human face(s), animal face(s)). In particular, the activity detector circuitry 210 executes one or more activity detection model(s) 228 to detect (e.g., recognize, predict) visual event(s) in the respective video frame(s) 207 that represent activit(ies) or event(s) performed by or associated with the subject(s) captured in the image(s) that are associated with or likely to be associated with spurious noise. For example, as a result of execution of the activity detection model(s) 228 for one or more of the video frames 207, the activity detector circuitry 210 can recognize an action such as a user raising his or her hand to his or her face. Based on the neural network model(s) 228, the activity detector circuitry 210 can identify such an action likely to be associated with a spurious noise (e.g., a sneeze, a cough). As another example, the activity detector circuitry 210 can recognize an action such as the user covering his or her mouth with his or her hand as associated with spurious noise based on execution of the activity detection model(s) 228 for the video frame(s) 207. As another example, the activity detector circuitry 210 can recognize an event such as a dog scratching a door based on image data of the dog raising its front legs. In examples in which two or more subjects are identified by the subject detector circuitry 208, the activity detector circuitry 210 can identify the visual event(s) based on performance of an activity by or associated with any of the subjects identified in the video frame(s) 206. In some examples, the activity detector circuitry 210 detects the activity or event based on analysis of each video frame 206. In other examples, the activity detector circuitry 210 recognizes the activity or event based on analysis of a sequence of video frames 206.

In some examples of FIG. 2, the activity detector circuitry 210 identifies (e.g., predicts) the type of activit(ies) or event(s) associated with the visual event(s) based on the neural-network-trained activity detection model(s) 228. In such examples, the activity detector circuitry 210 can classify the visual event(s) as associated with an activity such as sneezing, eating, coughing, etc.

In some examples of FIG. 2, the activity detector circuitry 210 identifies (e.g., predicts) a stage of the activity or event based on the neural network analysis of the video frame image data 206. For instance, as a result of execution of the activity detection model(s) 228, the activity detector circuitry 210 can recognize an action such as a user raising his or her hand to his or her face in a first video frame 206 and classify the action as a starting stage that precedes an activity such as a sneeze. The activity detector circuitry 210 can recognize an action such as a user covering his or her hand over his or her mouth in a second video frame 206 and classify the action as the active stage of an activity such as a sneeze, where the second video frame was generated after the first video frame. The activity detector circuitry 210 can recognize an action such as a user moving his or her hand away his or her mouth in a third video frame 206 and classify the action as the ending stage of an activity such as a sneeze, where the third video frame 206 was captured after the first video frame and the second video frame. In some examples, the activity detector circuitry 210 refrains from identifying an activity in a video frame as ending unless previously generated frames have been classified as including a starting or active activity.

In some examples of FIG. 2, if the activity detector circuitry 210 identifies one or more video frames 206 as including a visual event representative of an activity or event associated with or likely to be associated with spurious noise, the video filtering circuitry 212 filters the video frame 206 to remove, mask, distort, and/or generally hide the image of the user performing the activity from being output to the other participants in the video conference. The video filtering circuitry 212 filters the video frame(s) identified by the activity detector circuitry 210 based on one or more video filtering rule(s) 230. As a result of the filtering, the video filtering circuitry 212 generates filtered video frame(s) 213. Although the video filtering circuitry 212 is shown in the example of FIG. 2 as implemented by the visual event detector circuitry 106, in other examples, the video filtering circuitry 212 is separate from the visual event detector circuitry 106 (e.g., implemented by a video controller of the user device 102. In such examples, the visual event detector circuitry 106 transmits instructions to cause the video filtering circuitry 212 to filter the video stream signal 202.

The video filtering rule(s) 230 can define filter(s) to be applied to the video frame(s) to mask, hide, or otherwise remove image(s) of the activit(ies) or event(s) associated with or likely to be associated with a spurious audio event. In some instances, the video filtering rule(s) 230 define that at least a portion of the video frame(s) 206 identified by the activity detector circuitry 210 should be blurred. In other examples, the video filtering rule(s) 230 define that at least a portion of the video frame(s) 206 identified by the activity detector circuitry 210 should be concealed (e.g., blacked out). The video filtering rule(s) 230 can be defined based on user input(s) and stored in the database 222.

In some examples, the video filtering circuitry 212 is selectively activated based on, for example, user input(s) received by the visual event detector circuitry 106 and/or defined in the video filtering rule(s) 230. For instance, a user of the user device 102 can choose whether or not to enable video filtering by the video filtering circuitry 212. In other examples, the video filtering circuitry 212 automatically filters the video frame(s) 206 identified by the activity detector circuitry 210 as including the visual event(s).

In examples in which the video filtering circuitry 212 is not activated (e.g., based on user selection) and/or does not filter the video frame(s) 206 (e.g., because the activity detector circuitry 210 has not identified any visual event(s) in the image data), the video stream signal 202 is provided to the A/V sync circuitry 110 without filtering. In examples in which the video filtering circuitry 212 filters the video frame(s) 206, the visual event detector circuitry 106 outputs the filtered video frame(s) 213 to the A/V sync circuitry 110.

Thus, the visual event detector circuitry 106 analyzes the video stream signal 202 to identify visual event(s) representing activit(ies) or event(s) captured in the image data that are likely to be associated with or are associated with spurious audio event(s). In the example of FIG. 2, the audio control circuitry 108 filers the audio stream signal 204 based on the identification of visual event(s) indicative of spurious noise (e.g., by the user, by another subject such as an animal in the environment). The example audio control circuitry 108 of FIG. 2 includes audio preprocessor circuitry 233, audio filtering circuitry 234, and timer circuitry 236.

In the example of FIG. 2, the A/D converter 124 of the user device 102 samples the audio stream signal 204 and generates digital audio samples 207. The audio preprocessor circuitry 233 can include, for example, a low-pass voice to filter the audio samples 207 to reduce effects of ambient noise in the environment in which the user device 102 is located and captured by the microphone(s) 114. For instance, the audio preprocessor circuitry 233 can filter the audio samples 207 to remove noise that falls outside of a frequency range associated with a voice band of human speech.

The audio filtering circuitry 234 applies one or more audio filtering rule(s) 240 to the (e.g., prefiltered) audio sample(s) 207 to filter, mute, and/or otherwise remove spurious audio event(s). In the example of FIG. 2, the analysis of the video stream signal 202 by the visual event detector circuitry 106 and the analysis of the audio samples 207 by the audio control circuitry 108 occur substantially in real-time (e.g., in a near instantaneous manner (e.g., +/−16 milliseconds) recognizing there may be real-world delays for computing time, transmission, etc.) as the video data and the audio data are generated. Thus, the visual event(s) indicative of the occurrence or likely occurrence of spurious noise determined by the activity detector circuitry 210 corresponds in time to the audio samples 207 provided to the audio filtering circuitry 234.

The audio filtering rule(s) 240 can define that, in response to detection of a visual event the video frame(s) 206, the audio filtering circuitry 234 should cause the audio stream signal 204 to be muted. In such examples, the audio filtering circuitry 234 can apply a mute effect or filter to the audio sample(s) 207 to turn off the sound in the audio sample(s) 207. In other examples, the audio filtering circuitry 234 can cause volume associated with the audio sample(s) to be reduced or muffled. In some examples, the mute filter applied by the audio filtering circuitry 234 can include a crossfade to provide for a smooth transition or fading out of audio. The audio filtering circuitry 234 outputs processed audio sample(s) 242 to which the mute filter has been applied.

In some examples, the audio filtering rule(s) 240 indicate that the spurious noise should be removed from the audio sample(s) 207 while allowing other sounds to be presented. For instance, the audio filtering circuitry 234 can apply a noise reduction filter to the voice band of the audio signal and allow sounds associated with background noises (e.g., background music to pass). In such examples, the processed audio sample(s) 242 output by the audio control circuitry 108 have noise artifact(s) associated with the spurious audio event(s) removed or reduced (e.g., significantly reduced, muffled) in volume.

The audio filtering rule(s) 240 can include rule(s) that control the application of the filter(s) to the audio sample(s) 207 and the removal or cessation of the filtering. In some examples, audio filtering rule(s) 240 indicate the filter(s) should be applied for a particular duration of time. In some examples, the duration of time is based on the type of activity identified in visual event(s) by the activity detector circuitry 210. For instance, in examples in which the activity detector circuitry 210 identifies a visual event in the video frame(s) indicating that a user is about to sneeze, yawn, or cough (e.g., based on image data indicating that the user's hand is proximate to his or her face), the audio filtering rule(s) 240 can define that the filter (e.g., the mute filer, the noise reduction filter) should be applied for a predetermined amount of time, such as 500 milliseconds. The predetermined amount of time can be based on, for example, reference data defining average amounts of time for certain activities such as sneezing, yawning, coughing, etc. In other examples, the predetermined amount of time can be based on neural network training. for example, the duration for applying the audio filter can be defined by training a neural network to learn the duration of activit(ies) associated with certain audio event(s), such an average length of a yawn by a particular user. Such training can be performed based on, for instance, images of the user yawning, audio sample(s) of the user yawning, etc.

In examples which the application of the audio filtering is based on a predefined duration of time, the timer circuitry 236 monitors a time at which the filter was applied to a first audio sample 207 by the audio filtering circuitry 234. The timer circuitry 236 generates an alert when the predefined duration of time has expired. In response to the alert, the audio filtering circuitry 234 ceases applying the filter to the audio samples 207 (i.e., until the activity detector circuitry 210 identifies another visual event). For instance, the audio filtering circuitry 234 can stop applying the mute filter to the audio sample(s) 207 that are generated after the predefined time has expired, thereby unmuting the audio. Thus, in such examples, the processed audio sample(s) 242 output by the audio control circuitry 108 may not include a filter for spurious noise associated with user activity (because the activity associated with the spurious noise is predicted to be over).

In other examples, the audio filtering rule(s) 240 define that the application of the audio filtering should be based on the stage of the activity or event represented in the visual event(s) detected by the activity detector circuitry 210. In such examples, the activity detector circuitry 210 identifies and communicates the stage of the activity to the audio filtering circuitry 234. In such examples, in response an indication from the activity detector circuitry 210 that the activity is in the starting activity stage (which can include activities preceding an action such as a sneeze such as a user raising his or her hand to his or her mouth), the audio filtering circuitry 234 applies the audio filter to the audio sample(s) 207 (e.g., a mute filter, a noise reduction filter). In response an indication from the activity detector circuitry 210 that the activity is in the active activity stage, the audio filtering circuitry 234 continues to apply the audio filter to the subsequent audio sample(s) 207. When the audio filtering circuitry 234 receives an indication from the activity detector circuitry 210 that the activity is in the ending stage, the audio filtering circuitry removes or ceases to apply the audio filter to the subsequent audio sample(s) 207. In such instances, the processed audio sample(s) 242 output by the audio control circuitry 108 do not include the filter for spurious noise associated with the activity (because the activity or event associated with the spurious noise is predicted to be over).

The audio filtering rule(s) 240 can be defined by user input(s) and stored in a database 238. In some examples, the audio control circuitry 108 includes the database 238. In other examples, the database 238 is located external to the audio control circuitry 108 in a location accessible to the audio control circuitry 108 as shown in FIG. 2. In some examples, the database 222, 238 are the same database.

The filtered audio sample(s) 242 are output by the audio control circuitry 108 and transmitted to the A/V sync circuitry 110. The A/V sync circuitry 110 performs time synchronization of (a) the processed audio sample(s) 242 and (b) the video stream signal 202 or, when generated, the filtered video sample(s) 213. For example, the processed audio sample(s) 242 and the video stream signal 202 can include time stamp data corresponding to a time at which the audio or video was captured. The A/V sync circuitry 110 matches the time stamp(s) of the processed audio sample(s) 242 to the time stamp(s) of the video stream signal 202 to create a time synchronized audio and video stream. The A/V sync circuitry 110 outputs data including synchronized video data and amplified audio data for transmission to the video conference output device(s) 136 (e.g., via the cloud 134 and based on communication protocols associated with, for instance, the video conferencing application 132).

In examples disclosed herein, machine learning is used to improve efficiency of the subject detector circuitry 208 in detecting subject(s) (e.g., human face(s)) in the video frames 206 and the activity detector circuitry 210 in detecting visual event(s) representative of user activit(ies) that are likely to be associated with spurious noise. As disclosed herein, the subject detector circuitry 208 executes the neural-network-trained subject detection model(s) 226 to detect subject(s) (e.g., user(s), animal(s), object(s)) in the video frame(s) 206. Also, the activity detector circuitry 210 executes the neural-network-trained activity detection model(s) 228 to identify visual event(s) representative of activit(ies) or event(s) that are likely to be associated with spurious noise, to identify the type of activity or event, and/or to identify the stage of the activity or event. In the example of FIG. 2, the neural network model(s) 226, 228 are trained by neural network generator circuitry 244. In the example of FIG. 2, the neural network generator circuitry 244 can be implemented by the processor circuitry 104 of the user device 102 of FIG. 1, the processor circuitry 142 of the second user device 140, and/or cloud-based device(s) 134 (e.g., server(s), processors(s), and/or virtual machine(s) in the cloud 134 of FIG. 1).

The example neural network generator circuitry 244 of FIG. 2 includes neural network trainer circuitry 246. The example neural network trainer circuitry 246 of FIG. 2 performs training of the neural network implemented by neural network processing circuitry 248. In the example of FIG. 2, the neural network trainer circuitry 246 of FIG. 2 performs training of the neural network based on training data stored in a database 250.

In the example of FIG. 2, the subject detection model(s) 226 can be trained using first training data 252. The first training data 252 can include previously generated image data including subjects such as human faces, dogs, cats, objects that may be found in an environment such as an office, etc. The previously generated image data can be collected by the camera(s) 116 associated with the user device(s) 102 and/or different user devices. In some examples, previously generated video frame(s) 206 extracted from the video stream signal 202 by the video preprocessing circuitry 106 are used as the first training data 252.

The neural network trainer circuitry 246 trains the neural network implemented by the neural network processor circuitry 248 using the first training data 252 to detect subjects in image data. One or more subject detection model(s) 226 are generated as a result of the neural network training. The subject detection model(s) 226 are stored in the database 222. In other examples, the subject detection model(s) 226 can be stored in a different database. The databases 222, 250 may be the same storage device or different storage devices.

In the example of FIG. 2, the activity detection model(s) 228 can be trained using second training data 254. The second training data 254 can include previously generated image data illustrating activities or events associated with or likely associated with spurious noise (e.g., user(s) performing activities such as sneezing, coughing, eating, yawning; animals performing different activities such as jumping, barking; event(s) such as boxes falling to the ground). The second training data 254 can include, for instance, images of individuals performing the activities in different stages (e.g., raising a hand to one's face, sneezing, lowering the hand away from the face, etc.). The previously generated image data can be collected by the camera(s) 116 associated with the user device(s) 102 and/or different user devices. In some examples, previously generated video frame(s) 206 extracted from the video stream signal 202 by the video preprocessing circuitry 106 are used as the second training data 254.

The neural network trainer circuitry 246 trains the neural network implemented by the neural network processing circuitry 248 using the second training data 254 to detect visual event(s) in image data representing activit(ies) or event(s) are associated with or are likely to be associated with spurious noise. In some examples, the neural network is trained to identify the type of activity or event and/or the stage of the activity or event (e.g., starting, active or in progress, ending). One or more activity detection model(s) 228 are generated as a result of the neural network training. The activity detection model(s) 228 are stored in the database 222. In other examples, the activity detection model(s) 228 can be stored in a different database.

In some examples, the video frame(s) 206 analyzed by the activity detector circuitry 210 and/or the results of the analysis of the video frame(s) 206 by the activity detector circuitry 210 are used as the second training data 254 as part of feedback learning. Thus, the activity detection model(s) 228 can be updated to provide for customized detection of visual event(s) and/or identification of additional event(s) indicative of spurious noise (e.g., repeated throat clearing, scratching, etc.). For instance, a user who types during video calls can cause sounds associated with selecting keys on a keyboard to be captured in the audio stream signal 204. The activity detection model(s) 228 can be updated based on image data of the user typing (e.g., from the video frame(s) 206) to identify the activit(ies) associated with typing sounds in the image data as a visual event that results in instructions to the audio control circuitry to filter the noise. In some examples, the detection of the event(s) can be verified based on other types of data, such as a sensor data generated by sensor(s) of the user device or another device in the environment that can detect, for instance, vibrations (e.g., data from an accelerometer of the user device that detect vibration on a keyboard indicative of typing).

During a video conference (e.g., during operation of the video conferencing application 132), the camera(s) 116 of the user device 102 generate the video stream signal 202 over time and the microphone(s) 114 generate the audio stream signal 204 over time. The visual event detector circuitry 106 of FIGS. 1 and/or 2 analyzes new video data in the video stream signal 202 to determine if there have been any changes with respect to visual event(s) indicative of activit(ies) or event(s) associated with spurious noise (e.g., the detection of a new visual event, a change in the activity stage represented by a previously identified visual event, etc.). The audio control circuitry 108 of FIGS. 1 and/or 2 dynamically responds to changes in visual event(s) and, thus, activit(ies) or event(s) associated with spurious noise, by filtering the audio stream signal 204 over time based on instructions from the visual event detector circuitry 106. As a result, the example system 100 of FIGS. 1 and/or 2 provides for dynamic filtering of spurious noise associated with activit(ies) or event(s) performed by or associated with subject(s) for the duration of a video conference.

In some examples, the example system 100 of FIGS. 1 and/or 2 includes means for detecting visual events. For example, the means for detecting visual events may be implemented by the visual event detector circuitry 106. In some examples, the visual event detector circuitry 106 may be implemented by machine executable instructions such as that implemented by the machine readable instructions 500 of FIG. 5 and/or the machine readable instructions 700 of FIG. 7 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the visual event detector circuitry 106 is implemented by other hardware logic circuitry, hardware implemented state machines, and/or any other combination of hardware, software, and/or firmware. For example, the visual event detector circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for detecting visual events includes means for detecting subject(s) in image data. For example, the means for detecting subject(s) may be implemented by the subject detector circuitry 208. In some examples, the subject detector circuitry 208 may be implemented by machine executable instructions such as that implemented by at least blocks 506 and 508 of FIG. 5 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the subject detector circuitry 208 is implemented by other hardware logic circuitry, hardware implemented state machines, and/or any other combination of hardware, software, and/or firmware. For example, the subject detector circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for detecting visual events includes means for detecting activity. For example, the means for detecting activity may be implemented by the activity detector circuitry 210. In some examples, the activity detector circuitry 210 may be implemented by machine executable instructions such as that implemented by at least blocks 510, 512, 514, 516, and 518 of FIG. 5 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the activity detector circuitry 210 is implemented by other hardware logic circuitry, hardware implemented state machines, and/or any other combination of hardware, software, and/or firmware. For example, the activity detector circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for detecting visual events includes means for filtering video. For example, the means for filtering video may be implemented by the video filtering circuitry 212. In some examples, the video filtering circuitry 212 may be implemented by machine executable instructions such as that implemented by at least blocks 520 and 522 of FIG. 5 and/or blocks 706 and 710 of FIG. 7 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the video filtering circuitry 212 is implemented by other hardware logic circuitry, hardware implemented state machines, and/or any other combination of hardware, software, and/or firmware. For example, the video filtering circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example system 100 of FIGS. 1 and/or 2 includes means for controlling audio. For example, the means for controlling may be implemented by the audio control circuitry 108. In some examples, the audio control circuitry 108 may be implemented by machine executable instructions such as that implemented by the machine readable instructions 600 of FIG. 6 and/or the machine readable instructions 700 of FIG. 7 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the audio control circuitry 108 is implemented by other hardware logic circuitry, hardware implemented state machines, and/or any other combination of hardware, software, and/or firmware. For example, the audio control circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for controlling audio includes means for filtering audio. For example, the means for filtering audio may be implemented by the audio filtering circuitry 234. In some examples, the audio filtering circuitry 234 may be implemented by machine executable instructions such as that implemented by at least blocks 606 and 608 of FIG. 6 and/or blocks 706 and 710 of FIG. 7 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the audio filtering circuitry 234 is implemented by other hardware logic circuitry, hardware implemented state machines, and/or any other combination of hardware, software, and/or firmware. For example, the audio filtering circuitry 234 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the visual event detector circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example video preprocessor circuitry 214, the example subject detector circuitry 208, the example activity detector circuitry 210, the example video filtering circuitry 212, and/or, more generally, the example visual event detector circuitry 106 of FIG. 1, may be implemented by hardware alone or by hardware in combination with software and/or firmware. Thus, for example, any of the example video preprocessor circuitry 214, the example subject detector circuitry 208, the example activity detector circuitry 210, the example video filtering circuitry 212, and/or, more generally, the example visual event detector circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example visual event detector circuitry 106 of FIG. 1 may include one or more elements, processes, and/or devices in addition to, or instead of, those illustrated in FIG. 2, and/or may include more than one of any or all of the illustrated elements, processes, and devices.

While an example manner of implementing the audio control circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example audio preprocessor circuitry 233, the example audio filtering circuitry 234, the example timer circuitry 236, and/or, more generally, the example audio control circuitry 108 of FIG. 1, may be implemented by hardware alone or by hardware in combination with software and/or firmware. Thus, for example, any of the example audio preprocessor circuitry 233, the example audio filtering circuitry 234, the example timer circuitry 236, and/or, more generally, the example audio control circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audio control circuitry 108 of FIG. 1 may include one or more elements, processes, and/or devices in addition to, or instead of, those illustrated in FIG. 2, and/or may include more than one of any or all of the illustrated elements, processes, and devices.

While an example manner of implementing the neural network generator circuitry 244 is illustrated in FIG. 2, one or more of the elements, processes, and/or devices illustrated in FIG. 2 may be combined, divided, re-arranged, omitted, eliminated, and/or implemented in any other way. Further, the example neural network trainer circuitry 246, the example neural network processor circuitry 248, and/or, more generally, the example neural network generator circuitry 244 of FIG. 2, may be implemented by hardware alone or by hardware in combination with software and/or firmware. Thus, for example, any of the example neural network trainer circuitry 246, the example neural network processor circuitry 248, and/or, more generally, the example neural network generator circuitry 244, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example neural network generator circuitry 244 may include one or more elements, processes, and/or devices in addition to, or instead of, those illustrated in FIG. 2, and/or may include more than one of any or all of the illustrated elements, processes, and devices.

Figure 3:
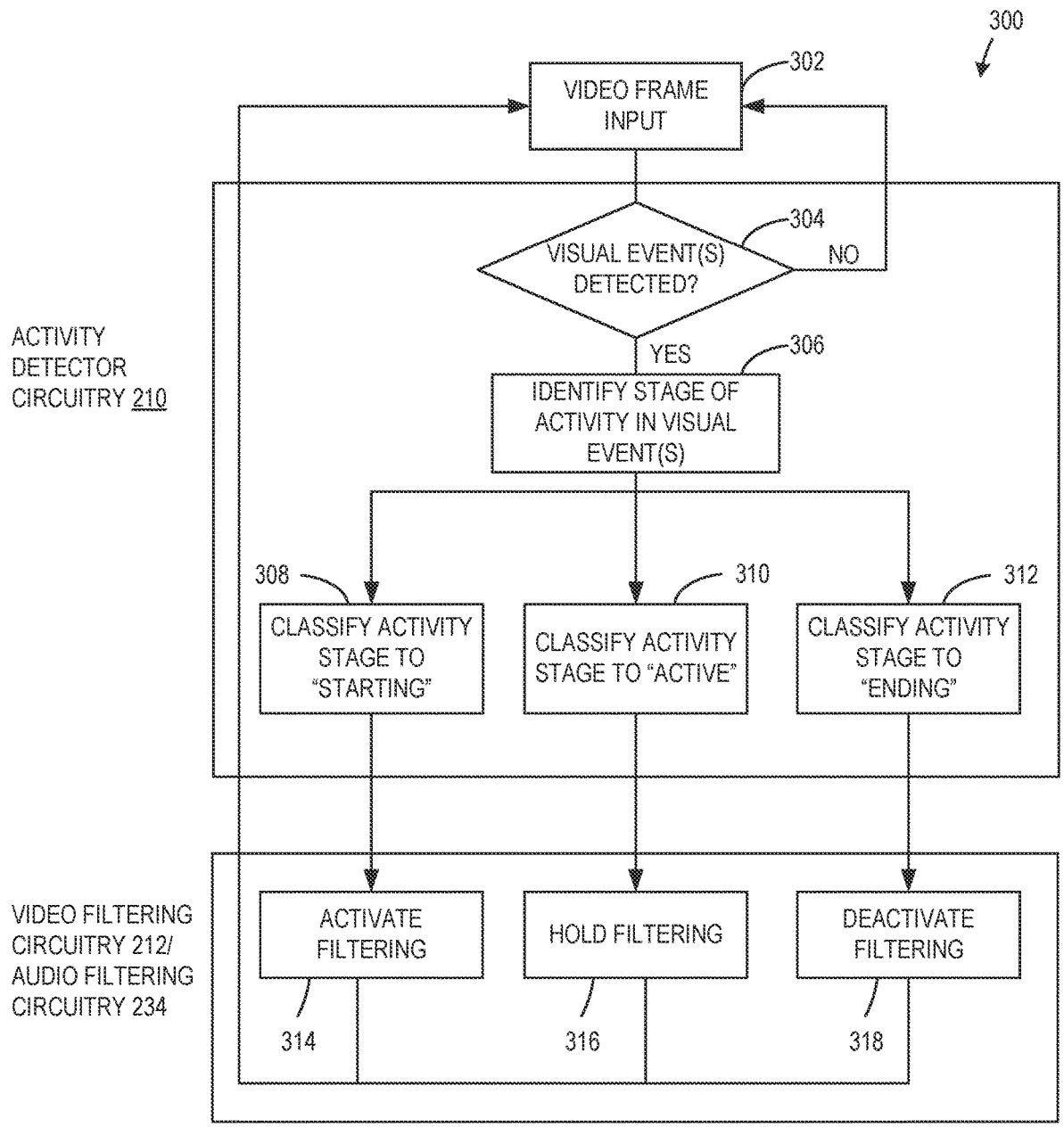
FIG. 3 is a flow diagram showing example responses by the example visual event detector circuitry and the example audio control circuitry of FIG. 2 to a visual event representative of an activity indicative of a likelihood of spurious noise.

FIG. 3 is a flow diagram 300 showing example responses by the example visual event detector circuitry 106 and the example audio control circuitry 108 of FIG. 2 to visual event(s) representative of activit(ies) or event(s) indicative of a likelihood of spurious noise.

At block 302 of the example of FIG. 3, the video frame(s) 206 are provided to the activity detector circuitry 210. The video frame(s) 206 video stream can be extracted from the video stream signal 202 generated by the camera(s) 116 of the user device 102 and pre-filtered and/or pre-processed by the video preprocessor circuitry 214 and/or the subject detector circuitry 208.

At block 304, the activity detector circuitry 210 analyzes the video frame(s) 206 to identify visual event(s) in the video frame(s) that represent activit(ies) or event(s) associated with or likely to be associated with spurious noise. For example, the activity detector circuitry 210 executes the activity detection model(s) 228 to identify the visual event(s) in the video frame image data.

At block 306 in the example of FIG. 3, the activity detector circuitry 210 identifies, classifies, or predicts a stage of the activity or event represented by the visual event. The activity detector circuitry 210 can identify the stage of the activity based on analysis of the image data using the machine learning activity detection model(s) 228. As a result of execution of the activity detection model(s) 228, the activity detector circuitry 210 classifies the activity represented in the visual event as "starting" (which can include "preceding" activit(ies) and/or event(s) relative to an activity or event that causes the noise) (block 308), "active" (block 310), or "ending" (block 312). For instance, the activity detector circuitry 210 can classify an image of a user bringing a fork to his or her mouth as the starting or preceding stage of an activity such as eating. In some examples, the activity detector circuitry 210 refrains from assigning the "ending" stage classification to the video frame(s) unless previously generated frames have been classified as including an activity in the "starting" or "active" phases.

In examples in which the video frame(s) 206 are filtered in response to the identification of the visual event(s), the video filtering circuitry 212 filters the video frame(s) 206 based on the stage of the activity or event identified by the activity detector circuitry 210. In the example of FIG. 3, the video filtering circuitry 212 filters the video frame(s) 206 in response to the classification of the activity stage as "starting" (block 314), maintains or continues to filter the video frame(s) 206 in response to the classification of the activity stage as "active" (block 316), and ceases or stops filtering the video frame(s) 206 in response to the classification of the activity stage as "ending" (block 318).

Also, the audio filtering circuitry 234 filters the audio sample(s) 207 based on the stage of the activity identified by the activity detector circuitry 210. In the example of FIG. 3, the audio filtering circuitry 234 filters of the audio sample(s) 207 in response to the classification of the activity stage (block 314), maintains or continues to filter the audio sample(s) 207 in response to the classification of the activity stage (block 316), and ceases or stops filtering the audio sample(s) 207 in response to the classification of the activity stage (block 318).

Figure 4:
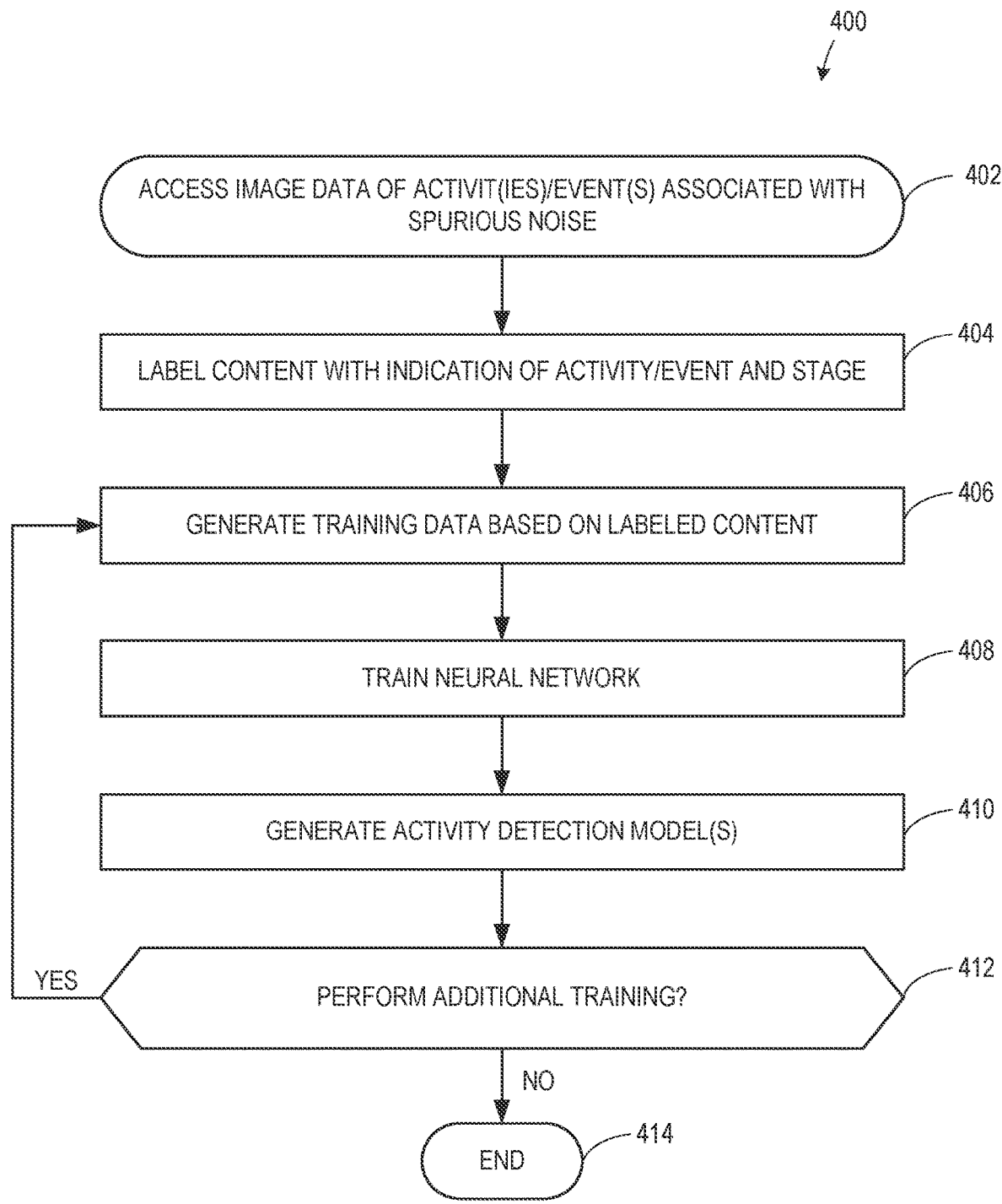
FIG. 4 is a flowchart representative of example machine readable instructions and/or operations that may be executed and/or instantiated by example processor circuitry to generate neural network model(s) for use by the example visual event detection circuitry of FIGS. 1 and/or 2 during analysis of video frames in accordance with teachings of this disclosure.
Figure 5:
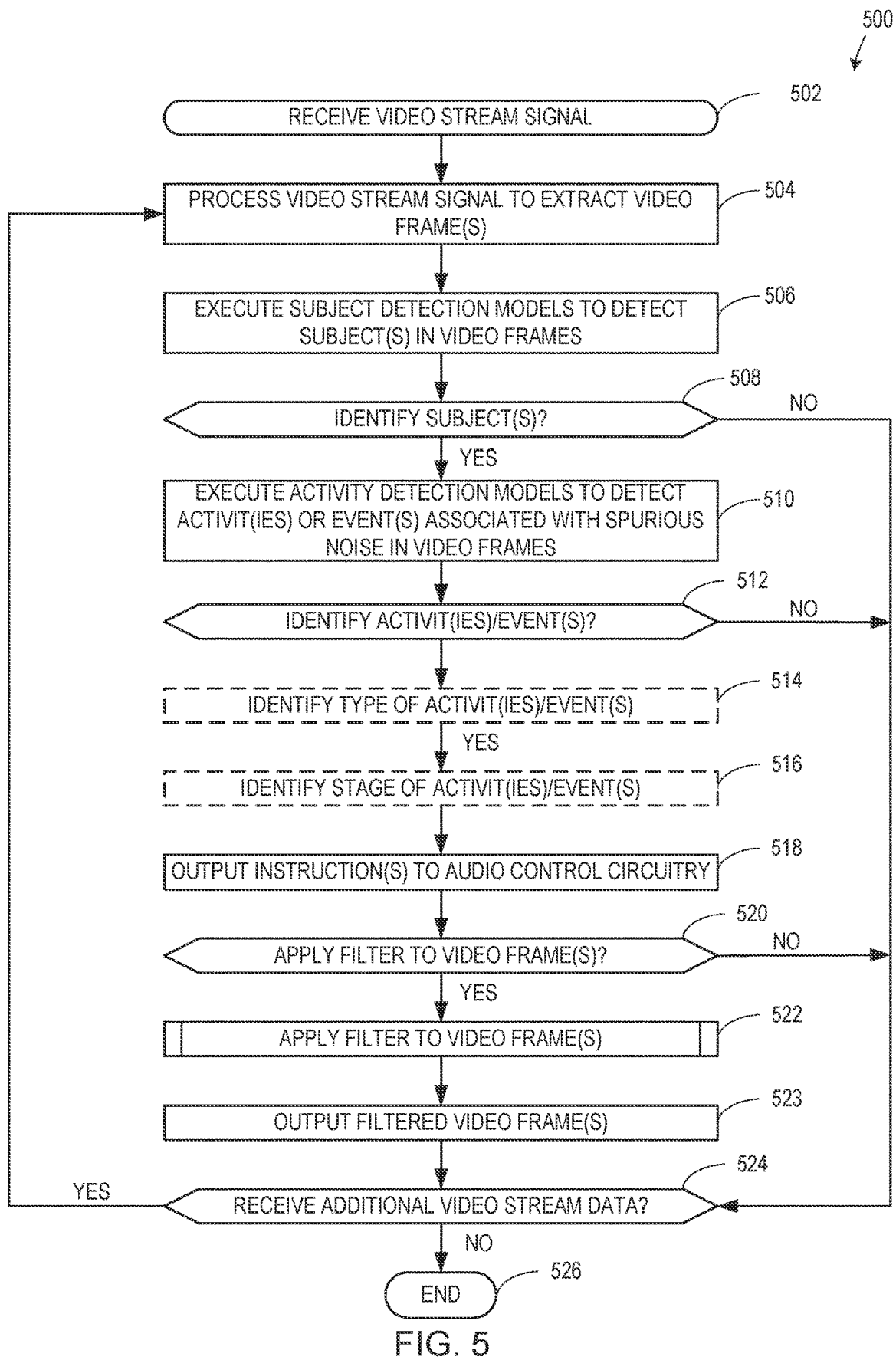
FIG. 5 is a flowchart representative of example machine readable instructions and/or operations that may be executed and/or instantiated by example processor circuitry to implement the visual event detector circuitry of FIGS. 1 and/or 2.
Figure 6:
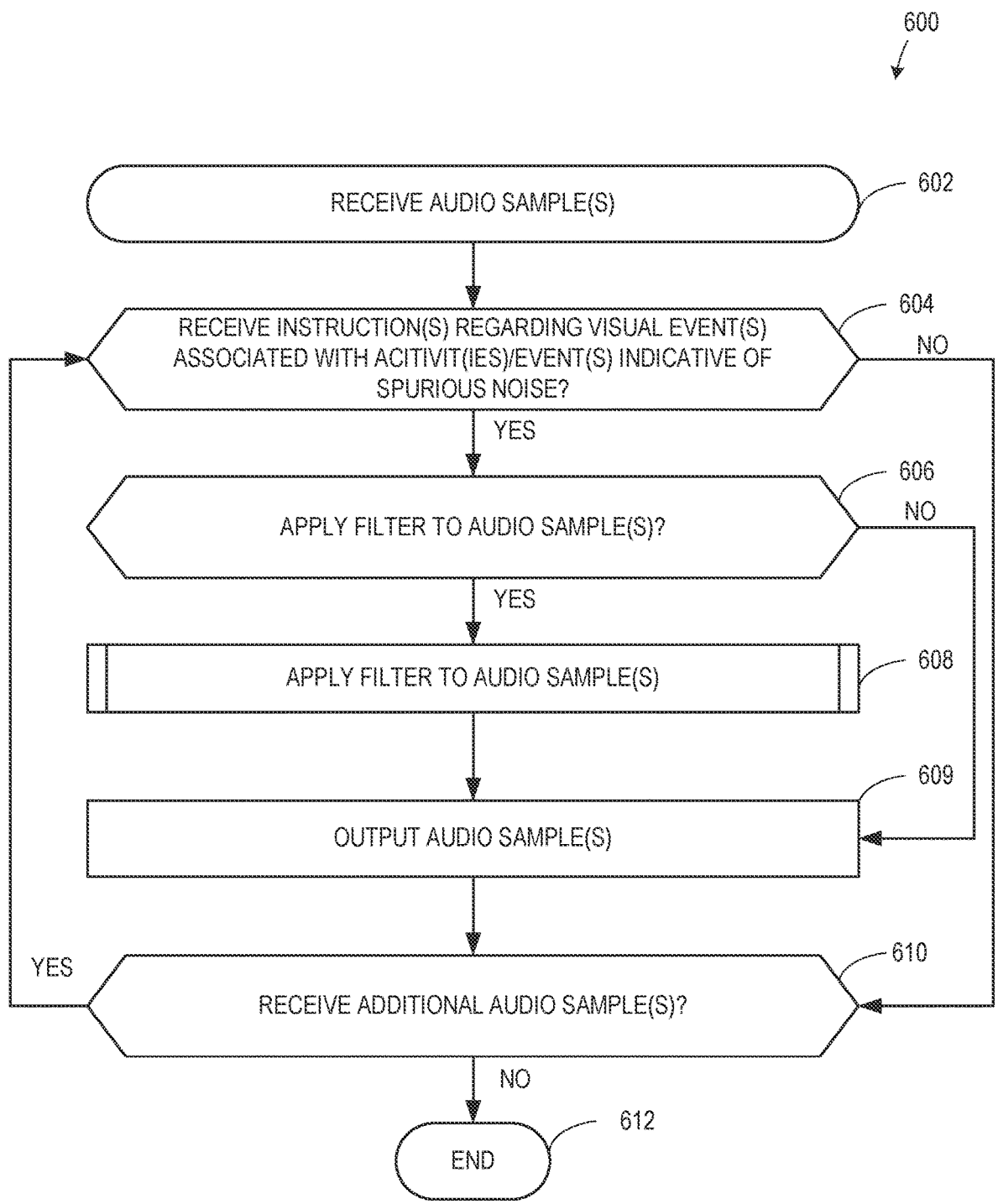
FIG. 6 is a flowchart representative of example machine readable instructions and/or operations that may be executed and/or instantiated by example processor circuitry to implement the audio control circuitry of FIGS. 1 and/or 2.
Figure 7:
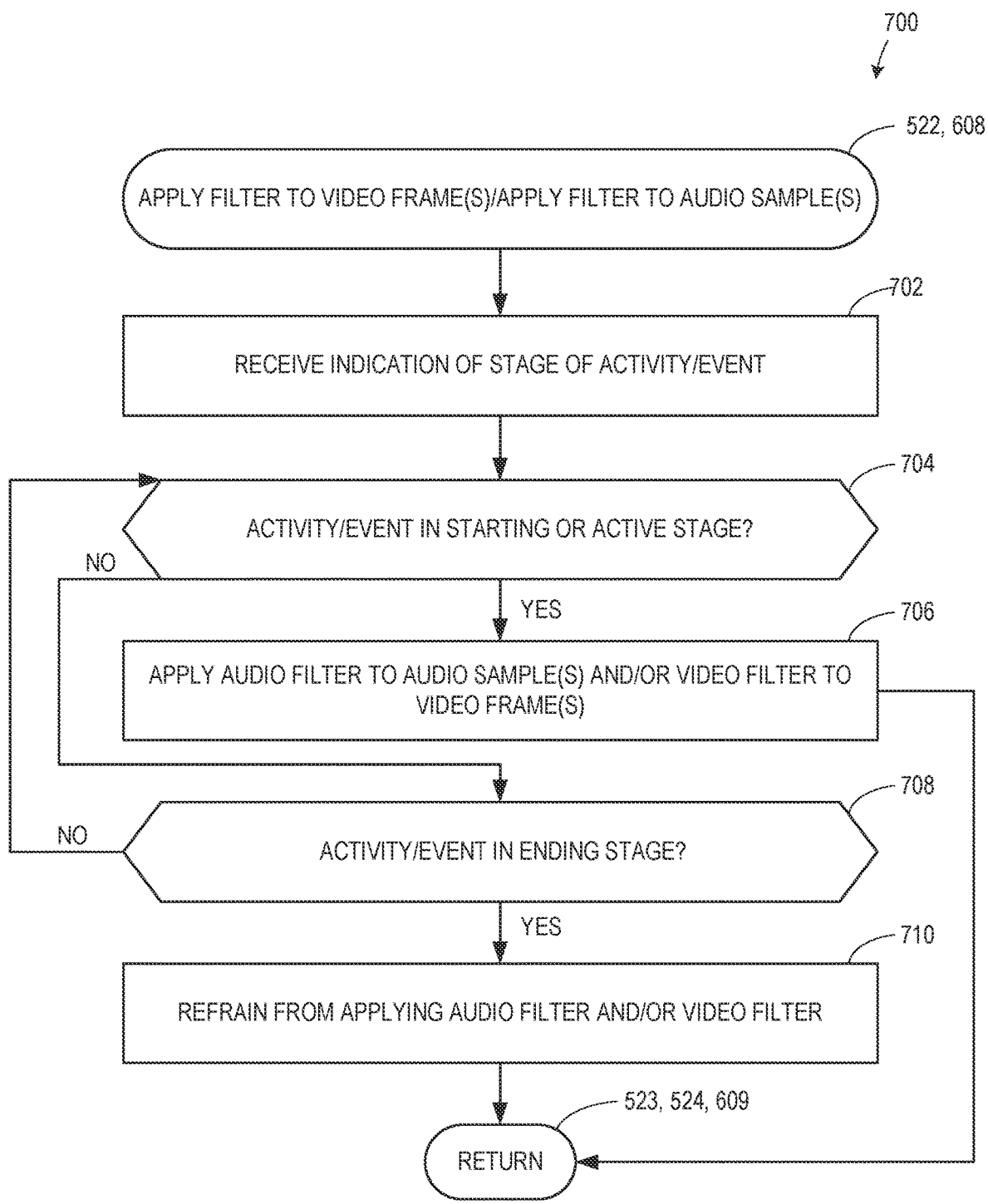
FIG. 7 is a flowchart representative of example machine readable instructions and/or operations that may be executed and/or instantiated by example processor circuitry to implement the visual event detector circuitry and/or the audio control circuitry of FIGS. 1 and/or 2 to provide for filtering of audio data and/or video data based on a stage of an activity associated with spurious noise.

A flowchart representative of example hardware logic circuitry, machine readable instructions, hardware implemented state machines, and/or any combination thereof for implementing the neural network generator circuitry 244 of FIG. 2 is shown in FIG. 4. Flowcharts representative of example hardware logic circuitry, machine readable instructions, hardware implemented state machines, and/or any combination thereof for implementing the visual event detector circuitry 106 of FIGS. 1 and/or 2 are shown in FIGS. 5 and 7. Flowcharts representative of example hardware logic circuitry, machine readable instructions, hardware implemented state machines, and/or any combination thereof for implementing the audio control circuitry 108 of FIGS. 1 and/or 2 are shown in FIGS. 6 and 7. The machine readable instructions may be one or more executable programs or portion(s) of an executable program for execution by processor circuitry, such as the processor circuitry 812, 912, 1012 shown in the example processor platform(s) 800, 900, 1000 discussed below in connection with FIGS. 8, 9, and 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart(s) illustrated in FIGS. 4, 5, 6, and/or 7, many other methods of implementing the example neural network generator circuitry 244, the example visual event detector circuitry 106, and/or the example audio control circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4, 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to train a neural network to detect visual event(s) representing activit(ies) or event(s) associated with spurious noise in image data. The example instructions 400 of FIG. 4, when executed by the neural network generator circuitry 244 of FIG. 4, result in a neural network and/or a model thereof (e.g., the activity detection model(s) 228), that can be distributed to other computing systems, such as the activity detector circuitry 210 of the example visual event detector circuitry 106 of FIG. 2.

The machine readable instructions and/or operations 400 of FIG. 4 begin at block 402, at which the neural network trainer circuitry 246 illustrated in FIG. 2 accesses the training data 252 and/or 254 that include images of activit(ies) or event(s) associated with spurious noise, such as images of individuals performing activities such as sneezing, yawning, etc. The training data 252, 254 can include the video frame(s) 206 as part of feedback training.

At block 404, the neural network trainer circuitry 246 labels the data 252, 254 with activit(ies) or event(s) and the stage of the activit(ies) or event(s) (e.g., starting, active, ending). At block 406, the example neural network trainer circuitry 246 generates the training data based on the labeled image data.

At block 408, the neural network trainer circuitry 246 performs training of the neural network processor circuitry 246 using the training data. In the example of FIG. 4, the training is based on supervised learning. As a result of the training, the activity detection model(s) 228 are generated at block 410. Based on the activity detection model(s) 228, the neural network is trained to identify visual events representing activit(ies) or event(s) associated with or likely to be associated with spurious noise in image data and the stage of the activit(ies) or event(s). The activity detection model(s) 228 can be stored in the database 222 for access by the activity detector circuitry 210 of the example visual event detector circuitry 106 of FIG. 2. The example instructions 400 of FIG. 4 end when no additional training (e.g., retraining) is to be performed (blocks 412, 414).

FIG. 5 is a flowchart representative of example machine readable instructions and/or example operations 500 that may be executed and/or instantiated by processor circuitry to implement the example visual event detector circuitry 106 of FIGS. 1 and/or 2 to detect visual event(s) representing activit(ies) or event(s) captured in image data (e.g., the video frames 206) and associated with or likely to be associated with spurious noise and to output instructions for audio filtering of the spurious noise events. The example instructions 500 of FIG. 5 can be implemented by the user device 102 that includes the camera(s) 116 that generate the video stream signal 202 and transmits the video stream signal 202 for output. In other examples, the example instructions 500 of FIG. 5 can be implemented by an electronic user device that receives the video stream signal 202, such as one of the video conference output devices 136.

The example instructions 500 of FIG. 5 start at block 502, at which the video preprocessor circuitry 214 receives the video stream signal 202 from a user input device (e.g., camera(s) 116).

At block 504, the video preprocessor circuitry 214 processes the video stream signal 202 to extract the video frames 206. In some examples, the video preprocessor circuitry 214 filters and/or down-samples the video stream signal 202.

At block 506, the subject detector circuitry 208 executes the neural-network based subject detection model(s) 226 to detect subject(s) (e.g., human face(s)) in the video frame(s) 206.

In the example of FIG. 5, if the subject detector circuitry 208 determines that the video frame(s) 206 do not contain a subject (e.g., a human face associated with a user) (block 508), then control proceeds to block 524 where the video preprocessor circuitry 214 determines if additional video stream signal data has been received.

In the example of FIG. 5, if the subject detector circuitry 208 identifies subject(s) in the video frame(s) 206, at block 510, the activity detector circuitry 210 executes the activity detection model(s) 228 to identify activit(ies) or event(s) captured in the video frame(s) 206, where the activit(ies) or event(s) are associated with or likely to be associated with spurious noise (e.g., user activities such as sneezing).

In examples in which the activity detector circuitry 210 does not identify any activities associated with or likely to be associated spurious noise based on the video frame image data, control proceeds to block 524 where the video preprocessor circuitry 214 determines if additional video stream signal data has been received.

In some examples in which the activity detector circuitry 210 identifies an activity or event associated with or likely to be associated with spurious noise in the video frame(s) 206, the activity detector circuitry 210 identifies the type of activity or event, such as a sneeze, a yawn, a cough, etc., based on execution of the activity detection model(s) 228 (block 514). Additionally or alternatively, the activity detector circuitry 210 identifies the stage of the activity or event (e.g., starting, active, ending) (block 516) based on execution of the activity detection model(s) 228 and as disclosed in connection with FIG. 3.

At block 518, the activity detector circuitry 210 generates and outputs instructions to the audio control circuitry 108 indicating that an activity or event associated with or likely to be associated with spurious noise. As disclosed in connection with FIG. 7, in some examples, the instructions include an indication of the phase or stage of the activity or event (e.g., starting, active, ending).

In examples in which the video filtering circuitry 212 does not apply a filter to the video frame(s) 206 in which the activity or event associated with or likely to be associated with spurious noise has been detected (block 520), control proceeds to block 524 where the video preprocessor circuitry 214 determines if additional video stream signal data has been received. In such examples, the video stream signal 202 is output without modification for spurious noise events.

In some examples of FIG. 5, the video filtering circuitry 212 applies a filter to the video frame(s) 206 in which the activity or event associated with or likely to be associated with spurious noise was detected (block 522). For example, the video filtering circuitry 212 can apply one or more filters to the video frame(s) 206 based on the video filtering rule(s) 230, such as blurring the video frame(s), concealing at least a portion of the video frame(s) 206, etc.

At block 523, the video filtering circuitry 212 outputs the filtered video frame(s) 213 for processing by the A/V sync circuitry 110 and transmission via, for instance, the cloud 134 of FIG. 1. The example instructions 500 of FIG. 5 end at blocks 524, 526 when no additional video stream signal data is received, FIG. 6 is a flowchart representative of example machine readable instructions and/or example operations 600 that may be executed and/or instantiated by processor circuitry to implement the example audio control circuitry 108 of FIG. 2 to apply filter(s) to the audio sample(s) in response to the detection of activit(ies) or event(s) associated with or likely to be associated with spurious noise by the visual event detector circuitry 106 of FIGS. 1 and/or 2.

The example instruction 600 of FIG. 6 begin at block 602, at which the audio control circuitry 108 receives the audio sample(s) 207 407 including sound captured by the microphone(s) 114.

At block 604, the audio control circuitry 108 receives instructions from the activity detector circuitry 210 indicating that one or more activities or event(s) associated with or likely to be associated with spurious noise have been identified in the corresponding video frame(s) 206, such as sneezing, yawning, coughing, etc. In some examples, the instructions from the activity detector circuitry 210 includes the stage of the activity or event, as disclosed in connection with FIG. 7.

At block 606, the audio filtering circuitry 234 determines if one or more filers are to be applied to the audio sample(s) 207 based on the instructions received from the activity detector circuitry 210 and/or the audio filtering rule(s) 240. In some examples, the audio filtering circuitry 234 determines that the filter should be applied based on the stage of the activity or event, as disclosed in connection with FIG. 7. In some examples, the audio filtering circuitry 234 determines that the filter should be applied based on information from the timer circuitry 236 indicating that a threshold or predefined amount of time for applying the filter in connection with a particular activity has not yet expired (e.g., applying a filter for 500 milliseconds in connection with sneezing). If the audio sample(s) are not to be filtered (e.g., because the activity is identified as being in the ending stage, because the duration for applying the filter has expired), then control proceeds to block 609, where the (e.g., unfiltered) audio sample(s) 207 are output for processing by the A/V sync circuitry 110.

At block 608, if the audio filtering circuitry 234 determines that a filter is to be applied the audio sample(s) 207, the audio filtering circuitry 234 applies the filter to the audio sample(s) 207. The filters can include a mute filter or a noise reduction filter to prevent or substantially prevent the spurious noise associated with the activity or event from being output or otherwise mitigate the noise (e.g., reduce a volume of the noise).

At block 609, the audio filtering circuitry 234 outputs the processed audio sample(s) 242 for processing by the A/V sync circuitry 110 and transmission via, for instance, the cloud 134 of FIG. 1. The example instructions 600 of FIG. 6 end at blocks 610, 612 when no additional audio stream signal data is received.

FIG. 7 is a flowchart representative of example machine readable instructions and/or example operations 700 that may be executed and/or instantiated by processor circuitry to cause the video filtering circuitry 212 to apply the video filter(s) to the video frame(s) 206 based on a stage of an activity or event associated with or likely be associated with spurious noise in connection with block 522 of FIG. 5 and/or to cause the audio filtering circuitry 234 to apply the audio filter(s) to the audio sample(s) 207 based on the stage of the activity or event associated with or likely be associated with spurious noise in connection with block 608 of FIG. 6.

At block 702, the video filtering circuitry 212 and/or the audio filtering circuitry 234 receives, from the activity detector circuitry 210, an indication of the stage of the activity or event that was detected by activity detector circuitry 210 in the image data.

In the example of FIG. 7, control proceeds based on the classification of the stage of the activity or event (block 704). At block 706, if the activity or event is in the "starting" stage (which can include activit(ies) or event(s) preceding the noise-generating activity or event) or the "active" stage, then the video filtering circuitry 212 applies video filter(s) to the video frame(s) 206 based on video filtering rule(s) 230, and/or the audio filtering circuitry 234 applies audio filter(s) to the audio sample(s) 207 based on audio filtering rule(s) 240.

In the example of FIG. 7, if the instructions from the activity detector circuitry 210 indicate that the activity or event is in the "ending" stage, then control proceeds to block 710, where the video filtering circuitry 212 refrains from applying the video filter to the video frame(s) 206 and/or the audio filtering circuitry 234 refrains from applying the audio filter to the audio sample(s) 207. Put another way, in such instances, although a visual event representative of an activity or event associated with or likely to be associated with spurious noise has been identified in the image data, the video filtering circuitry 212 and/or the audio filtering circuitry 234 may refrain from applying the filter(s) based on identification of the activity as ending.

In examples which the video filtering circuitry 212 and/or the audio filtering circuitry 234 perform the filtering, control returns to block 523 of FIG. 5, where the video filtering circuitry 212 outputs the filtered video frame(s) 213 and block 609 of FIG. 6, where the audio filtering circuitry 234 outputs the filtered audio sample(s) 242. In examples in which the filter(s) are not applied, control returns to block 524 of FIG. 5 and the video stream signal 202 is output without filtering and block 609 of FIG. 6, where the audio filtering circuitry 234 outputs the audio sample(s) 242 without filtering for spurious noise.

Figure 8:
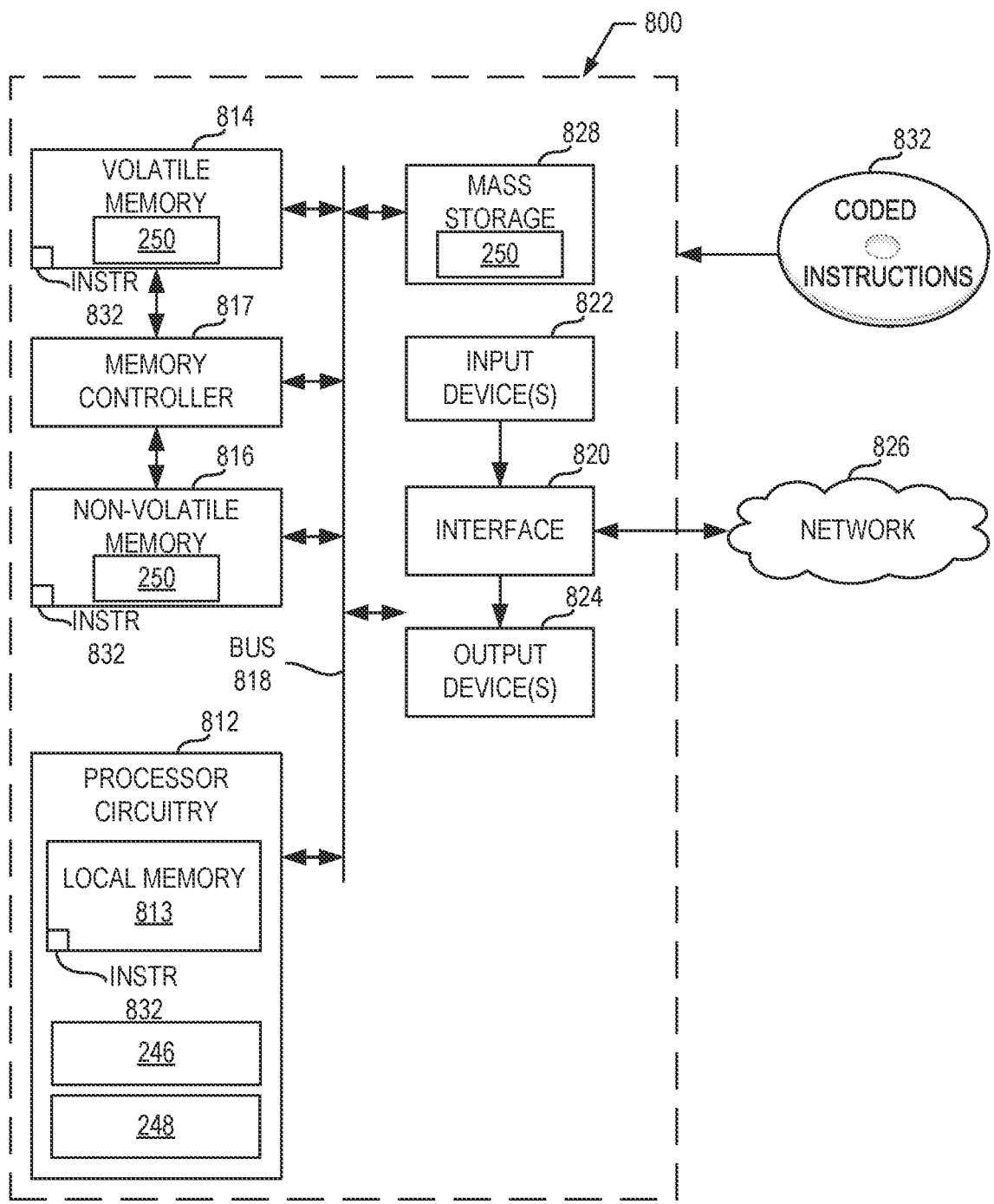
FIG. 8 is a block diagram of an example processing platform including processor circuitry structured to execute the example machine readable instructions of FIG. 4 to implement the neural network generator circuitry of FIG. 2.

FIG. 8 is a block diagram of an example processor platform 800 structured to execute and/or instantiate the machine readable instructions and/or operations of FIG. 4 to implement the neural network generator circuitry 244 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example neural network trainer circuitry 246 and the example neural network processor circuitry 248.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 4, may be stored in the mass storage device 828, in the volatile memory 814, in the non-volatile memory 816, and/or on a removable non-transitory computer readable storage medium such as a CD or DVD.

Figure 9:
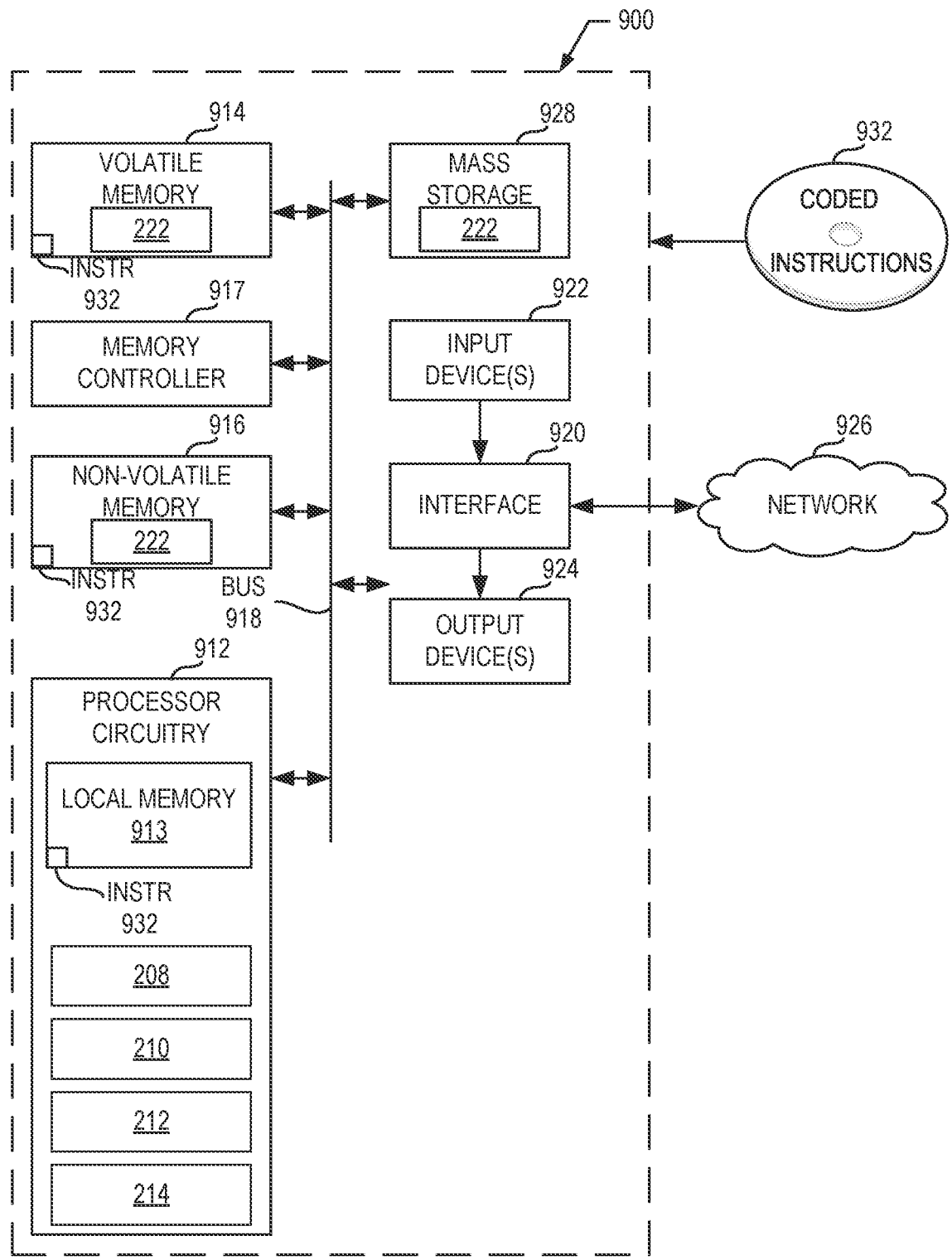
FIG. 9 is a block diagram of an example processing platform including processor circuitry structured to execute the example machine readable instructions of FIGS. 5 and/or 7 to implement the visual event detector circuitry of FIGS. 1 and/or 2.

FIG. 9 is a block diagram of an example processor platform 900 structured to execute and/or instantiate the machine readable instructions and/or operations of FIGS. 5 and/or 7 to implement the visual event detector circuitry 106 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example the example subject detector circuitry 208, the example activity detector circuitry 210, the example video filtering circuitry 212, and the example video preprocessor circuitry 214.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIGS. 5 and/or 7, may be stored in the mass storage device 928, in the volatile memory 914, in the non-volatile memory 916, and/or on a removable non-transitory computer readable storage medium such as a CD or DVD.

Figure 10:
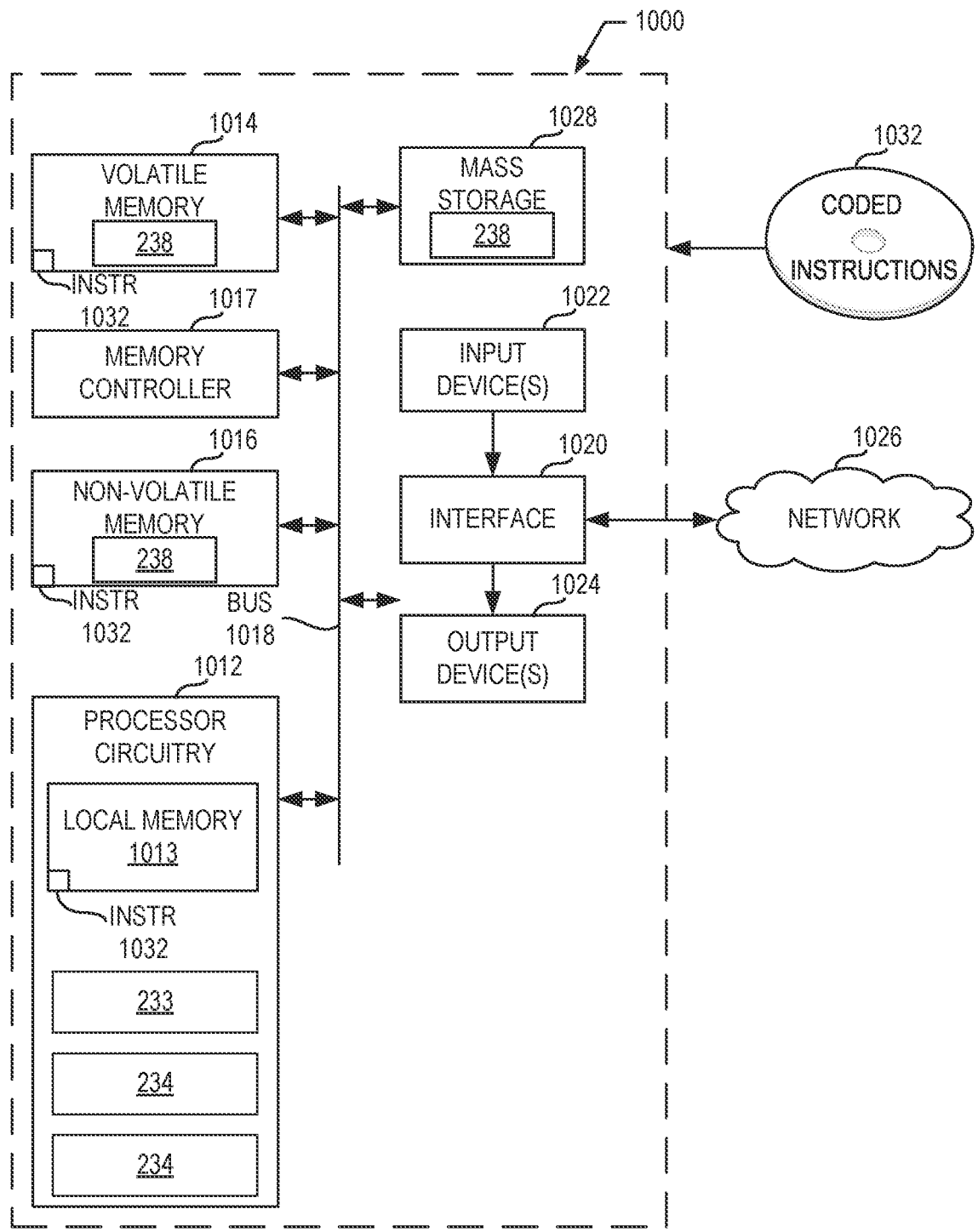
FIG. 10 is a block diagram of an example processing platform including processor circuitry structured to execute the example machine readable instructions of FIGS. 6 and/or 7 to implement the audio control circuitry of FIGS. 1 and/or 2.

FIG. 10 is a block diagram of an example processor platform 1000 structured to execute and/or instantiate the machine readable instructions and/or operations of FIGS. 6 and/or 7 to implement the audio control circuitry 108 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example audio preprocessor circuitry 233, the example audio filtering circuitry 234, and the example timer circuitry 236.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 6 and/or 7, may be stored in the mass storage device 1028, in the volatile memory 1014, in the non-volatile memory 1016, and/or on a removable non-transitory computer readable storage medium such as a CD or DVD.

Figure 11:
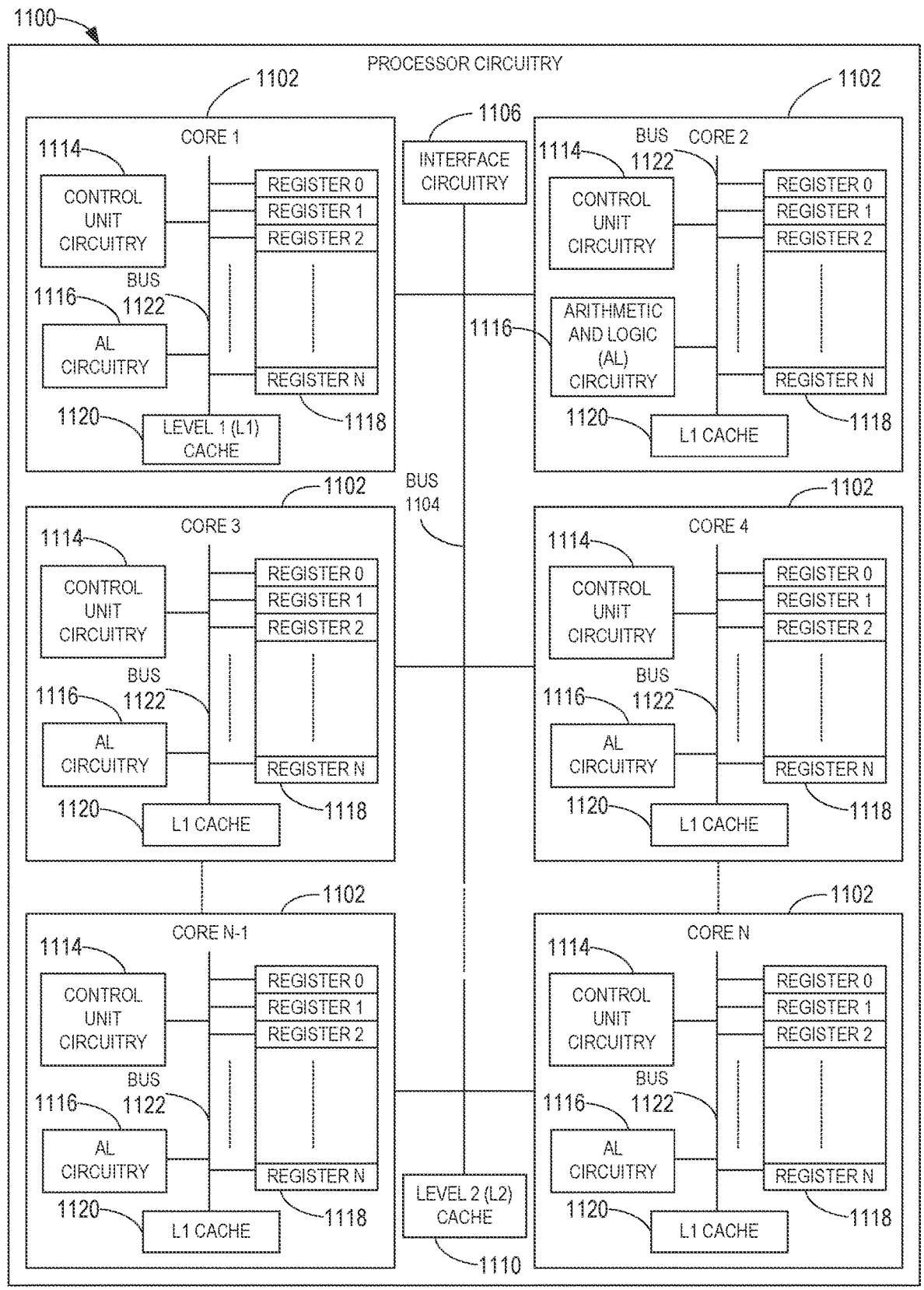
FIG. 11 is a block diagram of an example implementation of the processor circuitry of FIGS. 8, 9, and/or 10.

FIG. 11 is a block diagram of an example implementation of the processor circuitry 812 of FIG. 8, the processor circuitry 912 of FIG. 9, and/or the process circuitry 1012 of FIG. 10. In this example, the processor circuitry 812 of FIG. 8, the processor circuitry 912 of FIG. 9, and/or the process circuitry 1012 of FIG. 10 is implemented by a microprocessor 1100. For example, the microprocessor 1000 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIGS. 4, 5, 6, and/or 7.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L28 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 814, 816 of FIG. 8; the main memory 914, 916 of FIG. 9; and/or the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
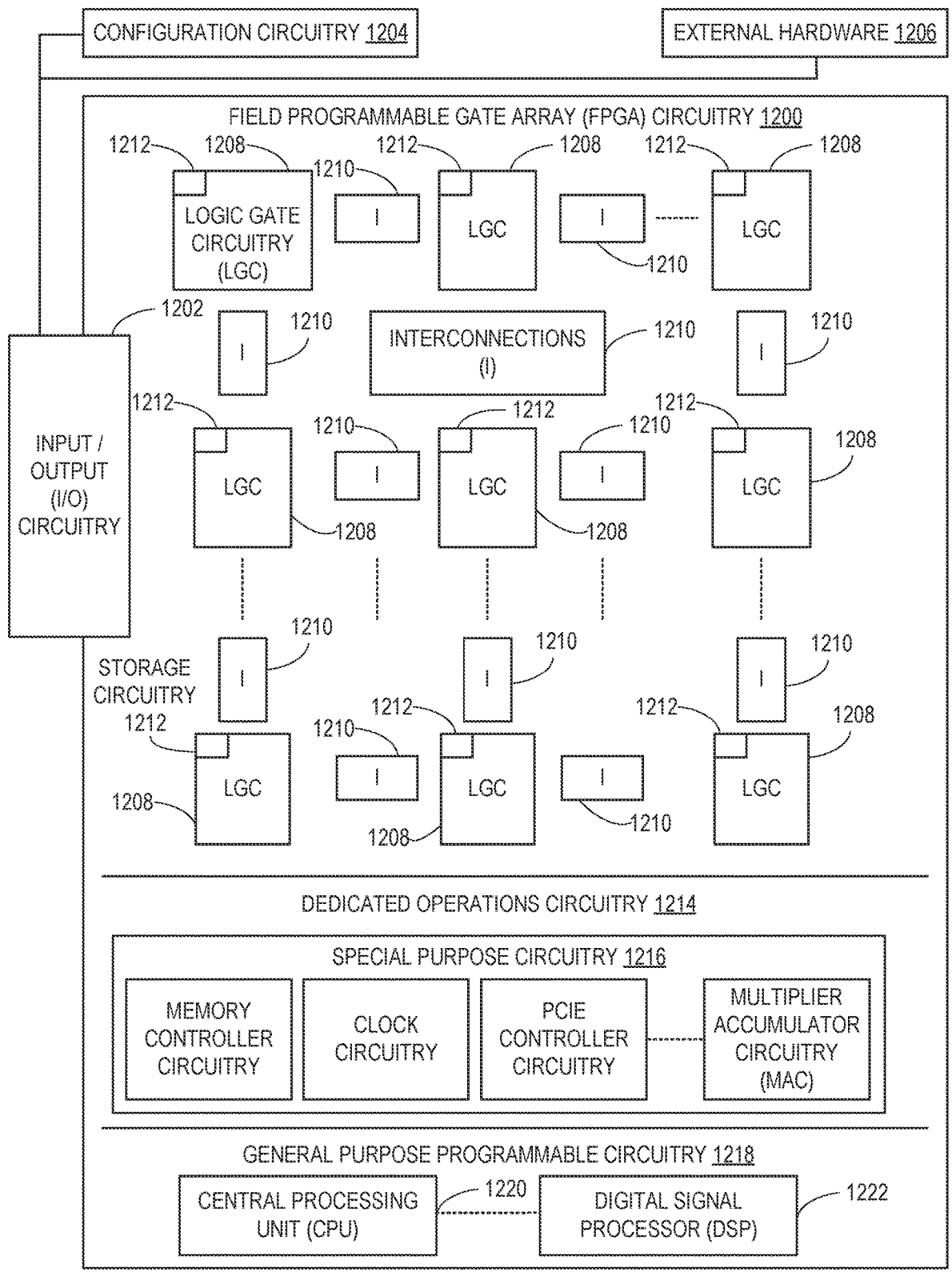
FIG. 12 is a block diagram of another example implementation of the processor circuitry of FIGS. 8, 9, and/or 10.

FIG. 12 is a block diagram of another example implementation of the processor circuitry 812 of FIG. 8, the processor circuitry 912 of FIG. 9, and/or the process circuitry 1012 of FIG. 10. In this example, the processor circuitry 812 of FIG. 8, the processor circuitry 912 of FIG. 9, and/or the process circuitry 1012 of FIG. 10 is/are implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart(s) of FIGS. 4, 5, 6, and/or 7 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart(s) of FIGS. 4, 5, 6, and/or 7. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart(s) of FIGS. 4, 5, 6, and/or 7. As such, the FPGA circuitry 1200 may be structured to effectively instantiate some or all of the machine readable instructions of the flowchart(s) 4, 5, 6, and/or 7 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 4, 5, 6, and/or 7 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 4, 5, 6, and/or 7 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 812 of FIG. 8, the processor circuitry 912 of FIG. 9, and/or the processor circuitry 1012 of FIG. 10, many other approaches are contemplated. For example, as mentioned above, modern FPGA circuitry may include an on-board CPU, such as one or more of the example CPU 1120 of FIG. 11. Therefore, the processor circuitry 812 of FIG. 8, the processor circuitry 912 of FIG. 9, and/or the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart(s) of FIGS. 4, 5, 6, and/or 7 may be executed by one or more of the cores 1102 of FIG. 11 and a second portion of the machine readable instructions represented by the flowchart(s) of FIGS. 4, 5, 6, and/or 7 may be executed by the FPGA circuitry 1200 of FIG. 12.

In some examples, the processor circuitry 812 of FIG. 8, the processor circuitry 912 of FIG. 9, and/or the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 812 of FIG. 8, the processor circuitry 912 of FIG. 9, and/or the processor circuitry 1012 of FIG. 10, which may be in one or more packages. For example, the XPU may include a CPU in one package, a DSP in another package, a GPU in yet another package, and an FPGA in still yet another package.

Figure 13:
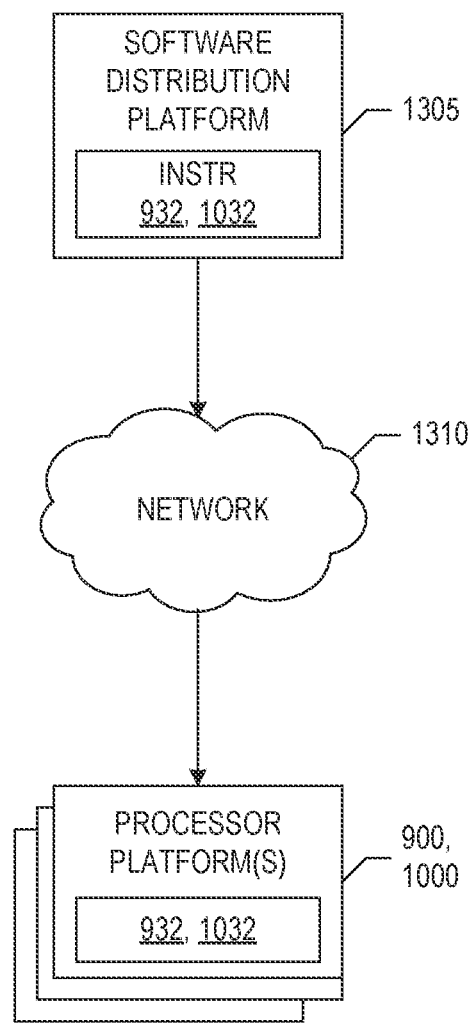
FIG. 13 is a block diagram of an example software distribution platform (e.g., one or more servers) to distribute software (e.g., software corresponding to the example machine readable instructions of FIGS. 5, and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 932 of FIG. 9 and/or the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 932 of FIG. 9 and/or the machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 932, which may correspond to the example machine readable instructions 500 of FIG. 5 and/or the machine readable instructions 700 of FIG. 7 as described above. The storage devices store the machine readable instructions 1032, which may correspond to the example machine readable instructions 600 of FIG. 6 and/or the machine readable instructions 700 of FIG. 7 as described above. The one or more servers of the example software distribution platform 1305 are in communication with a network 1310, which may correspond to any one or more of the Internet and/or any of the example networks 926, 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932, 1032 from the software distribution platform 1305. For example, the software, which may correspond to the example machine readable instructions 500, 600, 700 of FIGS. 5, 6, and/or 7, may be downloaded to the example processor platform(s) 900, 1000, which is to execute the machine readable instructions 932, 1032 to implement the visual event detector circuitry 106 and/or the audio control circuitry 108. In some examples, one or more servers of the software distribution platform 1305 periodically offer, transmit, and/or force updates to the software (e.g., the example machine readable instructions 932, 1032 of FIGS. 9 and/or 10) to ensure improvements, patches, updates, etc., are distributed and applied to the software at the end user devices.

From the foregoing, it will be appreciated that example systems, methods, apparatus, and articles of manufacture have been disclosed that provide for proactive filtering of spurious noise associated with activit(ies) or event(s) such as sneezing, eating, yawning, dogs barking, objects falling, etc. from an audio stream based detection of the activit(ies) or event(s) from a corresponding video stream during, for instance, a video conference. Examples disclosed herein execute neural network model(s) to identify visual event(s) representing activit(ies) or event(s) associated with or likely to be associated with spurious noise, including activit(ies) or event(s) that can precede generation of the noise (e.g., a user raising his or her hand to his or her mouth before coughing). In response detection of such an activity or event, examples disclosed herein generate instructions for the noise to be filtered from the audio stream to prevent or substantially prevent audio of the spurious noise (e.g., a sneeze, a cough) from being output during, for instance, a video conference. Some examples disclosed herein filer the video frame(s) to prevent or substantially prevent images of the activit(ies) or event(s) associated with the user or other subjects in the environment from being output (e.g., blur an image of a user sneezing, conceal an image of a dog scratching at a door). The disclosed systems, methods, apparatus, and articles of manufacture improve the efficiency of using a computing device by providing for automatic detection of visual event(s) representative of activit(ies) or event(s) likely to cause spurious noise and filtration of the noise. Further, examples disclosed herein use the video stream generated as part of the video conference to identify the visual events rather than using separate sensors or hardware to detect the activities. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for audio and video filtering for electronic user devices are disclosed herein. Further examples and combinations thereof include the following:

Example 1 includes an apparatus including at least one memory, instructions in the apparatus, and processor circuitry to execute the instructions to detect a visual event based on image data, the visual event representative of an activity associated with a likelihood of noise, the image data associated with a video stream output by a camera associated with a user device, and in response to the detection of the visual event, apply an audio filter to a portion of an audio stream corresponding to the image data in the video stream.

Example 2 includes the apparatus of example 1, wherein the image data includes first image data and the processor circuitry is to identify a first stage of the activity represented by the visual event in the first image data, the processor circuitry to apply the audio filter in response to the detection of the first stage, detect a second stage of the activity represented by the visual event in a second image data associated with the video stream, and refrain from applying the audio filter in response to the detection of the second stage.

Example 3 includes the apparatus of examples 1 or 2, wherein the processor circuitry is to apply the audio filter for a duration of time based on the activity.

Example 4 includes the apparatus of any of examples 1-3, wherein the processor circuitry is to apply the audio filter by causing the portion of the audio stream to be muted.

Example 5 includes the apparatus of any of examples 1-4, wherein the processor circuitry is to apply the audio filter by filtering the noise from the portion of the audio stream.

Example 6 includes the apparatus of any of examples 1-5, wherein the audio filter is a first filter, and the processor circuitry is to apply a second filter to a portion of the video stream including the visual event.

Example 7 includes the apparatus of any of examples 1-6, wherein the processor circuitry is to apply the second filter by causing the portion of the video stream to be blurred or concealed.

Example 8 includes the apparatus of any of examples 1-7, wherein the activity includes an activity performed by a user.

Example 9 includes the apparatus of any of examples 1-8, wherein the activity includes an event in an environment in which the user device is located.

Example 10 includes at least one non-transitory computer-readable storage medium including instructions that, when executed, cause processor circuitry to at least detect a visual event in a first frame of a video stream generated by a camera associated with a user device, the visual event representative of a user activity associated with a likelihood of noise, and in response to the detection of the visual event, cause a filter to be applied to a portion of an audio stream corresponding to the first frame to generate a filtered audio stream, and cause the filtered audio stream to be output for transmission.

Example 11 includes the computer-readable medium of example 10, wherein the instructions, when executed, cause the processor circuitry to detect a first stage of the user activity in the first frame of the video stream, cause the filter to be applied in response to the detection of the first stage, detect a second stage of the user activity in a second frame of the video stream, and cause the application of the filter to be maintained in response to the detection of the second stage.

Example 12 includes the computer-readable medium of examples 10 or 11, wherein the instructions, when executed, cause the processor circuitry to detect a third stage of the user activity represented by the visual event in a third frame of the video stream, and generate instructions for application of the filter to end in response to the detection of the third stage.

Example 13 includes the computer-readable medium of any of examples 10-12, wherein the instructions, when executed, cause the processor circuitry to instruct the filter to be applied for a duration of time based on the user activity.

Example 14 includes the computer-readable medium of any of examples 10-13, wherein the instructions, when executed, cause the processor circuitry to instruct the filter to mute the portion of the audio stream.

Example 15 includes the computer-readable medium of any of examples 10-14, wherein the instructions, when executed, cause the processor circuitry to instruct the filter to filter the noise from the portion of the audio stream.

Example 16 includes the computer-readable medium of any of examples 10-15, wherein the filter is a first filter, and the instructions, when executed, cause the processor circuitry to cause a second filter to be applied to a portion of the video stream including the visual event.

Example 17 includes the computer-readable medium of any of examples 10-16, wherein the instructions, when executed, cause the processor circuitry to instruct the second filter to conceal the portion of the video stream.

Example 18 includes an apparatus including means for detecting a visual event based on a video stream generated via one or more cameras associated with a user device, the visual event representative of an activity associated with a likelihood of noise, and means for filtering audio, the audio filtering means to apply a filter to a portion of an audio stream associated with the video stream.

Example 19 includes the apparatus of example 18, including means for detecting activity, the activity detecting means to determine a first stage of the activity in a first frame of the video stream, and determine a second stage of the activity in a second frame of the video stream, the audio filtering means to apply the filter in response to detection of the first stage, and the audio filtering means to refrain from applying the filter in response to the detection of the second stage.

Example 20 includes the apparatus of examples 18 or 19, wherein the audio filtering means is to apply the filter for a duration of time based on the activity.

Example 21 includes the apparatus of any of examples 18-20, wherein the audio filtering means is to apply the filter to cause the portion of the audio stream to be muted.

Example 22 includes the apparatus of any of examples 18-21, wherein the audio filtering means is to apply the filter by removing the noise from the portion of the audio stream.

Example 23 includes the apparatus of any of examples 18-22, including means filtering video, the video filtering means to apply a video filter to a portion of the video stream including the visual event.

Example 24 includes the apparatus of any of examples 18-23, wherein the video filtering means is to apply the video filter by causing a portion of the portion of the video stream to be blurred.

Example 25 includes the apparatus of any of examples 18-24, wherein the activity includes an activity performed by a user.

Example 26 includes the apparatus of any of examples 18-25, wherein the activity includes an event in an environment in which the user device is located.

Example 27 includes a method including detecting, by executing an instruction with at least one processor, a visual event based on image data, the visual event representative of an activity associated with a likelihood of noise, the image data associated with a video stream output by a camera associated with a user device, and in response to detecting the visual event, applying by executing an instruction with at least one processor, an audio filter to a portion of an audio stream corresponding to the image data in the video stream.

Example 28 includes the method of example 27, wherein the image data is first image data and further including identifying a first stage of the activity represented by the visual event in the first image data, applying of the audio filter in response to the detection of the first stage, detecting a second stage of the activity represented by the visual event in second image data associated with the video stream, and refrain from applying the audio filter in response to the detection of the second stage.

Example 29 includes the method of examples 27 or 28, wherein applying the audio filter includes applying the audio filter for a duration of time based on the activity.

Example 30 includes the method of any of examples 27-29, wherein applying the audio filter includes causing the portion of the audio stream to be muted.

Example 31 includes the method of any of examples 27-30, wherein applying the audio filter includes filtering the noise from the portion of the audio stream.

Example 32 includes the method of any of examples 27-31, wherein the audio filter is a first filter, and further including applying a second filter to a portion of the video stream including the visual event.

Example 33 includes the method of any of examples 27-32, wherein applying the second filter includes blurring the portion of the video stream.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions; and
   at least one processor circuit to be programmed by the machine-readable instructions to:
   detect a first visual event associated with an activity in first image data of a video stream output by a camera associated with a user device, the activity associated with a likelihood of noise, the first image data associated with a first time;
   invoke a neural network to process the first image data to classify the first visual event as one of a first stage of the activity or a second stage of the activity, the first stage preceding generation of the noise, the second stage associated with the generation of the noise;
   cause application of an audio filter to a first portion of an audio stream corresponding to the first image data based on classification of the first visual event as the first stage or the second stage;
   detect a second visual event associated with the activity based on second image data of the video stream, the second image data associated with a second time, the second time after the first time;
   invoke the neural network to process the second image data to classify the second visual event as a third stage of the activity, the third stage different than the first stage and the second stage; and
   cause presentation of the second image data without audio filtering based on classification of the second visual event as the third stage.

2. The apparatus of claim 1, wherein one or more of the at least one processor circuit is to cause application of the audio filter for a duration of time based on the activity.

3. The apparatus of claim 1, wherein one or more of the at least one processor circuit is to cause application of the audio filter by causing the first portion of the audio stream to be muted.

4. The apparatus of claim 1, wherein one or more of the at least one processor circuit is to cause application of the audio filter by filtering the noise from the first portion of the audio stream.

5. The apparatus of claim 1, wherein the audio filter is a first filter, and one or more of the at least one processor circuit is to cause application of a second filter to a third portion of the video stream including the first visual event.

6. The apparatus of claim 5, wherein one or more of the at least one processor circuit is to cause application of the second filter by causing the third portion of the video stream to be blurred or concealed.

7. The apparatus of claim 1, wherein the activity includes an activity performed by a user of the user device.

8. The apparatus of claim 1, wherein the activity includes an event in an environment in which the user device is located.

9. The apparatus of claim 1, wherein the first stage of the activity includes a hand of a user moving toward another portion of a body of the user, and the third stage of the activity includes the hand of the user moving away from the portion of the body of the user.

10. The apparatus of claim 1, wherein one or more of the at least one processor circuit is to cause application of the audio filter by causing a volume of the first portion of the audio stream to be reduced.

11. At least one non-transitory computer-readable storage medium comprising machine-readable instructions to cause at least one processor circuit to at least:
- detect a first visual event associated with a user activity in a first frame of a video stream generated by a camera associated with a user device, the user activity associated with a likelihood of noise, the first frame associated with a first time;
- invoke a neural network to process the first frame to classify the first visual event as one of a first stage of the user activity or a second stage of the user activity, the first stage preceding generation of the noise, the second stage associated with the generation of the noise;
- cause application of a filter to a first portion of an audio stream corresponding to the first frame to generate a filtered audio stream based on classification of the first visual event as the first stage or the second stage;
- cause the filtered audio stream to be output for transmission;
- detect a second visual event associated with the user activity in a second frame of the video stream, the second frame associated with a second time, the second time after the first time;
- invoke the neural network to process the second frame to classify the second visual event as a third stage of the user activity, the third stage different than the first stage and the second stage; and
- cause presentation of a second portion of the audio stream corresponding to the second frame without filtering based on classification of the second visual event as the third stage.

12. The at least one non-transitory computer-readable medium of claim 11, wherein the machine-readable instructions are to cause one or more of the at least one processor circuit to:
- detect a third visual event associated with the user activity in a third frame of the video stream, the third frame associated with a third time, the third time between the first time and the second time; and
- cause the application of the filter to be maintained in response to the detection of the third visual event.

13. The at least one non-transitory computer-readable medium of claim 11, wherein the machine-readable instructions are to cause one or more of the at least one processor circuit to cause application of the filter for a duration of time based on the user activity.

14. The at least one non-transitory computer-readable medium of claim 11, wherein the machine-readable instructions are to cause one or more of the at least one processor circuit to cause application of the filter to mute the first portion of the audio stream.

15. The at least one non-transitory computer-readable medium of claim 11, wherein the machine-readable instructions are to cause one or more of the at least one processor circuit to cause application of the filter to filter the noise from the first portion of the audio stream.

16. The at least one non-transitory computer-readable medium of claim 11, wherein the filter is a first filter, and the machine-readable instructions are to cause one or more of the at least one processor circuit to cause application of a second filter to a third portion of the video stream including the first visual event.

17. The at least one non-transitory computer-readable medium of claim 16, wherein the machine-readable instructions are to cause one or more of the at least one processor circuit to cause application of the second filter to conceal the third portion of the video stream.

18. A method comprising:
- detecting, by at least one processor circuit programmed by at least one instruction, a first visual event associated with an activity in first image data of a video stream output by a camera associated with a user device, the activity associated with a likelihood of noise, the first image data associated with a first time;
- invoking a neural network to process the first image data to classify the first visual event as one of a first stage of the activity or a second stage of the activity, the first stage preceding generation of the noise, the second stage associated with the generation of the noise;
- causing, by one or more of the at least one processor circuit, application of an audio filter to a first portion of an audio stream corresponding to the first image data based on classification of the first visual event as the first stage or the second stage;
- detecting, by one or more of the at least one processor circuit, a second visual event associated with the activity based on second image data of the video stream, the second image data associated with a second time, the second time after the first time;
- invoking the neural network to process the second image data to classify the second visual event as a third stage of the activity, the third stage different than the first stage and the second stage; and
- causing presentation of a second portion of the audio stream corresponding to the second image data without audio filtering based on classification of the second visual event as the third stage.

19. The method of claim 18, wherein causing application of the audio filter includes causing application of the audio filter for a duration of time based on the activity.

20. The method of claim 18, wherein causing application of the audio filter includes causing the first portion of the audio stream to be muted.

21. The method of claim 18, wherein causing application of the audio filter includes causing filtering of the noise from the first portion of the audio stream.

22. The method of claim 18, wherein the audio filter is a first filter, and further including causing application of a second filter to a third portion of the video stream including the first visual event.

23. The method of claim 22, wherein causing application of the second filter includes causing blurring of the third portion of the video stream.

24. The method of claim 18, wherein the activity is associated with a source different than a user of the user device.

* * * * *